US012386774B2

(12) United States Patent
Balachandran et al.

(10) Patent No.: US 12,386,774 B2
(45) Date of Patent: Aug. 12, 2025

(54) AI ACCELERATOR APPARATUS USING FULL MESH CONNECTIVITY CHIPLET DEVICES FOR TRANSFORMER WORKLOADS

(71) Applicant: d-MATRIX CORPORATION, Santa Clara, CA (US)

(72) Inventors: Jayaprakash Balachandran, Santa Clara, CA (US); Aayush Ankit, Santa Clara, CA (US); Irene Quek, San Jose, CA (US); Sudeep Bhoja, Cupertino, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 145 days.

(21) Appl. No.: 18/486,872

(22) Filed: Oct. 13, 2023

(65) Prior Publication Data

US 2025/0123984 A1 Apr. 17, 2025

(51) Int. Cl.
*G06F 13/42* (2006.01)
*G06F 9/38* (2018.01)

(52) U.S. Cl.
CPC ...... *G06F 13/4221* (2013.01); *G06F 9/38873* (2023.08)

(58) Field of Classification Search
CPC ......................... G06F 13/4221; G06F 9/38873
USPC ........................................................ 710/313
See application file for complete search history.

(56) References Cited

U.S. PATENT DOCUMENTS

| | | | | |
|---|---|---|---|---|
| 11,848,670 | B2 * | 12/2023 | Serra | H03K 19/1776 |
| 11,977,766 | B2 * | 5/2024 | Dally | G06F 3/0655 |
| 12,013,808 | B2 * | 6/2024 | Koker | G06F 17/16 |
| 12,099,453 | B2 * | 9/2024 | Dally | G06F 13/1689 |
| 12,260,118 | B2 * | 3/2025 | Maheshwari | G11C 11/4096 |
| 2019/0245582 | A1 | 8/2019 | Burton | |
| 2020/0082246 | A1 * | 3/2020 | Shao | G06N 3/048 |
| 2020/0151847 | A1 * | 5/2020 | Schluessler | G06T 17/10 |
| 2022/0100247 | A1 * | 3/2022 | Garg | G06F 1/3203 |
| 2022/0107808 | A1 * | 4/2022 | Enamandram | G06F 9/3863 |

(Continued)

OTHER PUBLICATIONS

International Search Report and Written Opinion for related application PCT/US2024/050581 mailed Jan. 17, 2025.

*Primary Examiner* — Christopher B Shin
(74) *Attorney, Agent, or Firm* — Richard T. Ogawa; Ogawa P.C.

(57) ABSTRACT

An AI accelerator apparatus using in-memory compute chiplet devices. The apparatus includes a first semiconductor substrate having a plurality of chiplets, each of which includes a plurality of tiles. Each tile includes a plurality of slices, a central processing unit (CPU), and a hardware dispatch device. Each slice can include a digital in-memory compute (DIMC) device configured to perform high throughput computations. In particular, the DIMC device can be configured to accelerate the computations of attention functions for transformer-based models (a.k.a. transformers) applied to machine learning applications. The chiplets are in a full mesh connectivity configuration such that at least one of the die-to-die (D2D) interconnects of each chiplet is coupled to one of the D2D interconnects of each other chiplet using a non-diagonal link. The chiplets can also include other interfaces to facilitate communication between the chiplets, memory and a server or host system.

40 Claims, 44 Drawing Sheets

(56) References Cited

U.S. PATENT DOCUMENTS

| | | | | |
|---|---|---|---|---|
| 2022/0222194 | A1* | 7/2022 | Chandwani | G06F 13/1663 |
| 2022/0327083 | A1 | 10/2022 | Das Sharma et al. | |
| 2022/0334995 | A1 | 10/2022 | Das Sharma et al. | |
| 2023/0168899 | A1 | 6/2023 | Bhoja et al. | |
| 2023/0169021 | A1 | 6/2023 | Bhoja et al. | |
| 2024/0143505 | A1* | 5/2024 | Misra | G06F 12/0811 |
| 2024/0168915 | A1* | 5/2024 | Du | G06F 15/825 |
| 2025/0029659 | A1* | 1/2025 | Karda | G11C 16/08 |

* cited by examiner

| IMC – Matrix Multiply | | | | |
|---|---|---|---|---|
| 384 | IMCs | | | |
| Cycles | AC1 | AC2 | AC3 | AC4 |
| 1,024 | K1 | K1 | K2 | K2 |
| 1,024 | K3 | K3 | K4 | K4 |
| 1,024 | K5 | K5 | K6 | K6 |
| 1,024 | Q1 | Q1 | Q2 | Q2 |
| 1,024 | Q3 | Q3 | Q4 | Q4 |
| 1,024 | Q5 | Q5 | Q6 | Q6 |
| 1,024 | QKT1 | QKT2 | QKT3 | QKT4 |
| 1,024 | QKT5 | QKT6 | V1 | V1 |
| 1,024 | V2 | V2 | V3 | V3 |
| 1,024 | V4 | V4 | V5 | V5 |
| 1,024 | V6 | V6 | XV1 | XV2 |
| 1,024 | XV3 | XV4 | XV5 | XV6 |

| SIMD – Element Wise | | | | |
|---|---|---|---|---|
| | SIMDs | | | |
| Cycles | SIMD1 | SIMD2 | SIMD3 | SIMD4 |
| 3,072 | Smax1 | Smax2 | Smax3 | Smax4 |
| 3,072 | Smax5 | Smax6 | | |

| IMC – Matrix Multiply | | | | |
|---|---|---|---|---|
| 384 | IMCs | | | |
| Cycles | AC1 | AC2 | AC3 | AC4 |
| 1,024 | E1 | E1 | E1 | E1 |
| 1,024 | E1 | E1 | E1 | E1 |
| 1,024 | E2 | E2 | E2 | E2 |
| 1,024 | E2 | E2 | E2 | E2 |
| 1,024 | E3 | E3 | E3 | E3 |
| 1,024 | E3 | E3 | E3 | E3 |
| 1,024 | E4 | E4 | E4 | E4 |
| 1,024 | E4 | E4 | E4 | E4 |
| 1,024 | E5 | E5 | E5 | E5 |
| 1,024 | E5 | E5 | E5 | E5 |
| 1,024 | E6 | E6 | E6 | E6 |
| 1,024 | E6 | E6 | E6 | E6 |

| SIMD – Element Wise | | | | |
|---|---|---|---|---|
| | SIMDs | | | |
| Cycles | SIMD1 | SIMD2 | SIMD3 | SIMD4 |
| | | | | |
| 410 | GeLU1 | GeLU1 | GeLU1 | GeLU1 |
| 410 | GeLU1 | GeLU1 | GeLU1 | GeLU1 |
| 410 | GeLU2 | GeLU2 | GeLU2 | GeLU2 |
| 410 | GeLU2 | GeLU2 | GeLU2 | GeLU2 |
| 410 | GeLU3 | GeLU3 | GeLU3 | GeLU3 |
| 410 | GeLU3 | GeLU3 | GeLU3 | GeLU3 |
| 410 | GeLU4 | GeLU4 | GeLU4 | GeLU4 |
| 410 | GeLU4 | GeLU4 | GeLU4 | GeLU4 |
| 410 | GeLU5 | GeLU5 | GeLU5 | GeLU5 |
| 410 | GeLU5 | GeLU5 | GeLU5 | GeLU5 |
| 410 | GeLU6 | GeLU6 | GeLU6 | GeLU6 |
| 410 | GeLU6 | GeLU6 | GeLU6 | GeLU6 |

| IMC – Matrix Multiply | | | | |
|---|---|---|---|---|
| 384 | IMCs | | | |
| Cycles | AC1 | AC2 | AC3 | AC4 |
| 1,024 | F1 | F1 | F1 | F1 |
| 1,024 | F1 | F1 | F1 | F1 |
| 1,024 | F2 | F2 | F2 | F2 |
| 1,024 | F2 | F2 | F2 | F2 |
| 1,024 | F3 | F3 | F3 | F3 |
| 1,024 | F3 | F3 | F3 | F3 |
| 1,024 | F4 | F4 | F4 | F4 |
| 1,024 | F4 | F4 | F4 | F4 |
| 1,024 | F5 | F5 | F5 | F5 |
| 1,024 | F5 | F5 | F5 | F5 |
| 1,024 | F6 | F6 | F6 | F6 |
| 1,024 | F6 | F6 | F6 | F6 |

| SIMD – Element Wise | | | | |
|---|---|---|---|---|
| | SIMDs | | | |
| Cycles | SIMD1 | SIMD2 | SIMD3 | SIMD4 |
| | | | | |
| | F-b-1 | F-b-1 | F-b-1 | F-b-1 |
| 205 | LRN1 | LRN1 | LRN1 | LRN1 |
| | | | | |
| | F-b-2 | F-b-2 | F-b-2 | F-b-2 |
| 205 | LRN2 | LRN2 | LRN2 | LRN2 |
| | | | | |
| | F-b-3 | F-b-3 | F-b-3 | F-b-3 |
| 205 | LRN3 | LRN3 | LRN3 | LRN3 |
| | | | | |
| | F-b-4 | F-b-4 | F-b-4 | F-b-4 |
| 205 | LRN4 | LRN4 | LRN4 | LRN4 |
| | | | | |
| | F-b-5 | F-b-5 | F-b-5 | F-b-5 |
| 205 | LRN5 | LRN5 | LRN5 | LRN5 |
| | | | | |
| | F-b-6 | F-b-6 | F-b-6 | F-b-6 |
| 205 | LRN6 | LRN6 | LRN6 | LRN6 |

FIG. 13C

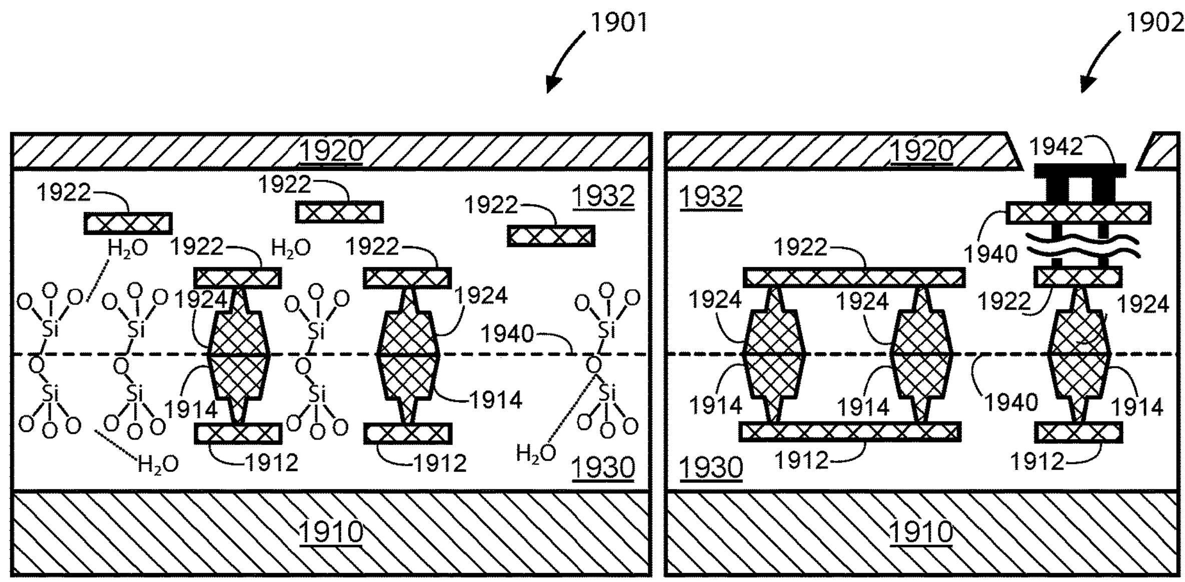
FIG. 19A
FIG. 19B
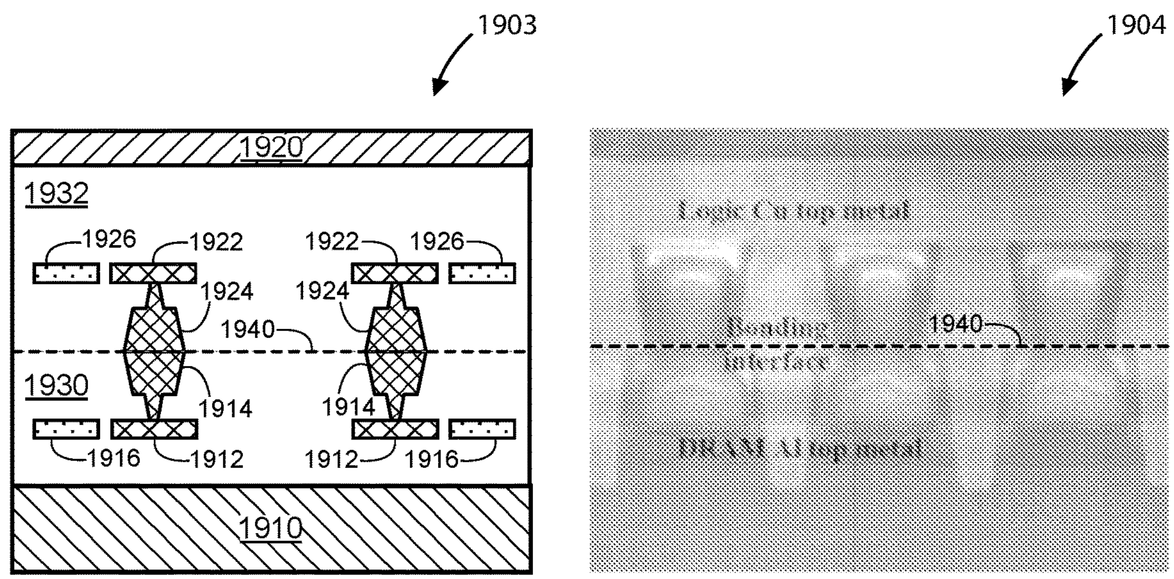
FIG. 19C
FIG. 19D

AI ACCELERATOR APPARATUS USING FULL MESH CONNECTIVITY CHIPLET DEVICES FOR TRANSFORMER WORKLOADS

CROSS-REFERENCES TO RELATED APPLICATIONS

N/A

BACKGROUND OF THE INVENTION

The present invention relates generally to integrated circuit (IC) devices and artificial intelligence (AI). More specifically, the present invention relates to methods and device structures for accelerating computing workloads in transformer-based models (a.k.a. transformers).

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers have significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and method to accelerate compute workloads for transformers are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

According to an example, the present invention provides for a method and structure of an AI accelerator apparatus configured with in-memory compute and full mesh connectivity. The apparatus can include a plurality of chiplets coupled together in the full mesh connectivity configuration. Each of these chiplets can include a plurality of tiles, and each of these tiles can include at least a plurality of slices, a central processing unit (CPU) coupled to the plurality of slices, and a hardware dispatch device coupled to the CPU. The apparatus includes a plurality of die-to-die (D2D) interconnects coupled to each of the CPUs in each of the tiles, and at least one of the D2D interconnects of each chiplet is coupled to one of the D2D interconnects of each other chiplet using a non-diagonal link. In a specific example, the plurality of chiplets includes at least four chiplets, and the each of the chiplets is coupled to each other chiplet in the full mesh connectivity configuration using a plurality of intra-chiplet non-diagonal links and a plurality of inter-chiplet non-diagonal links.

The apparatus can also include a first clock configured to output a clock signal of about 0.5 GHz to 4 GHz, and each of the slices can include a digital in memory compute (DIMC) device coupled to a second clock configured at an output rate of one half of the rate of the first clock. As discussed previously, this DIMC device can be configured to allow for a throughput of one or more matrix computations provided in the DIMC device such that the throughput is characterized by 512 multiply accumulates per a clock cycle. The chiplets can also include interconnect interfaces (e.g., PCIe interfaces, or the like), memory interfaces (e.g., DRAM interfaces, or the like), global CPU interfaces (e.g., RISC interfaces, or the like), as well as other interfaces to facilitate communication between the chiplets, memory and a server or host system.

The AI accelerator and chiplet device architecture and its related methods can provide many benefits. With modular chiplets, the AI accelerator apparatus can be easily scaled to accelerate the workloads for transformers of different sizes. The DIMC configuration within the chiplet slices also improves computational performance and reduces power consumption by integrating computational functions and memory fabric. Further, embodiments of the AI accelerator apparatus can allow for quick and efficient mapping from the transformer to enable effective implementation of AI applications.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 10 is a simplified table representing an example mapping process between a 24-layer transformer and an example eight-chiplet AI accelerator apparatus according to an example of the present invention.

FIGS. 13A-13C are simplified tables illustrating data flow through the IMC and single input multiple data (SIMD) modules according to an example of the present invention.

FIGS. 19A-19C are simplified diagrams illustrating a 3D stacked chiplet and memory device using a hybrid-bonding interconnection according to various examples of the present invention.

FIG. 19D is a device level image showing a cross-sectional view of a 3D stacked chiplet and memory device according to an example of the present invention.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
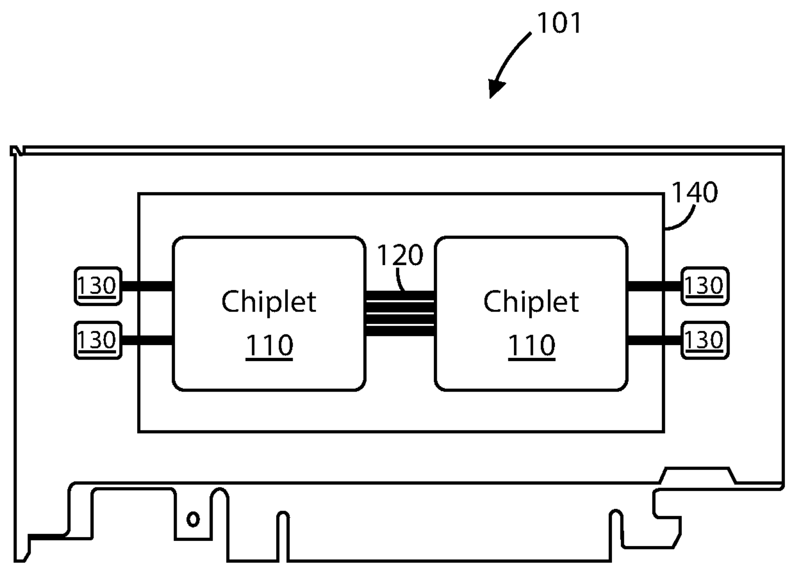
FIG. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
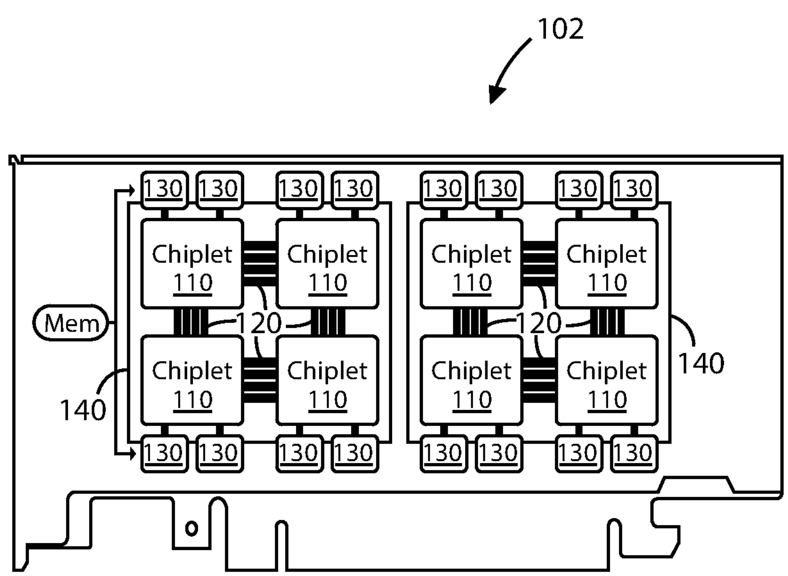

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel. Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
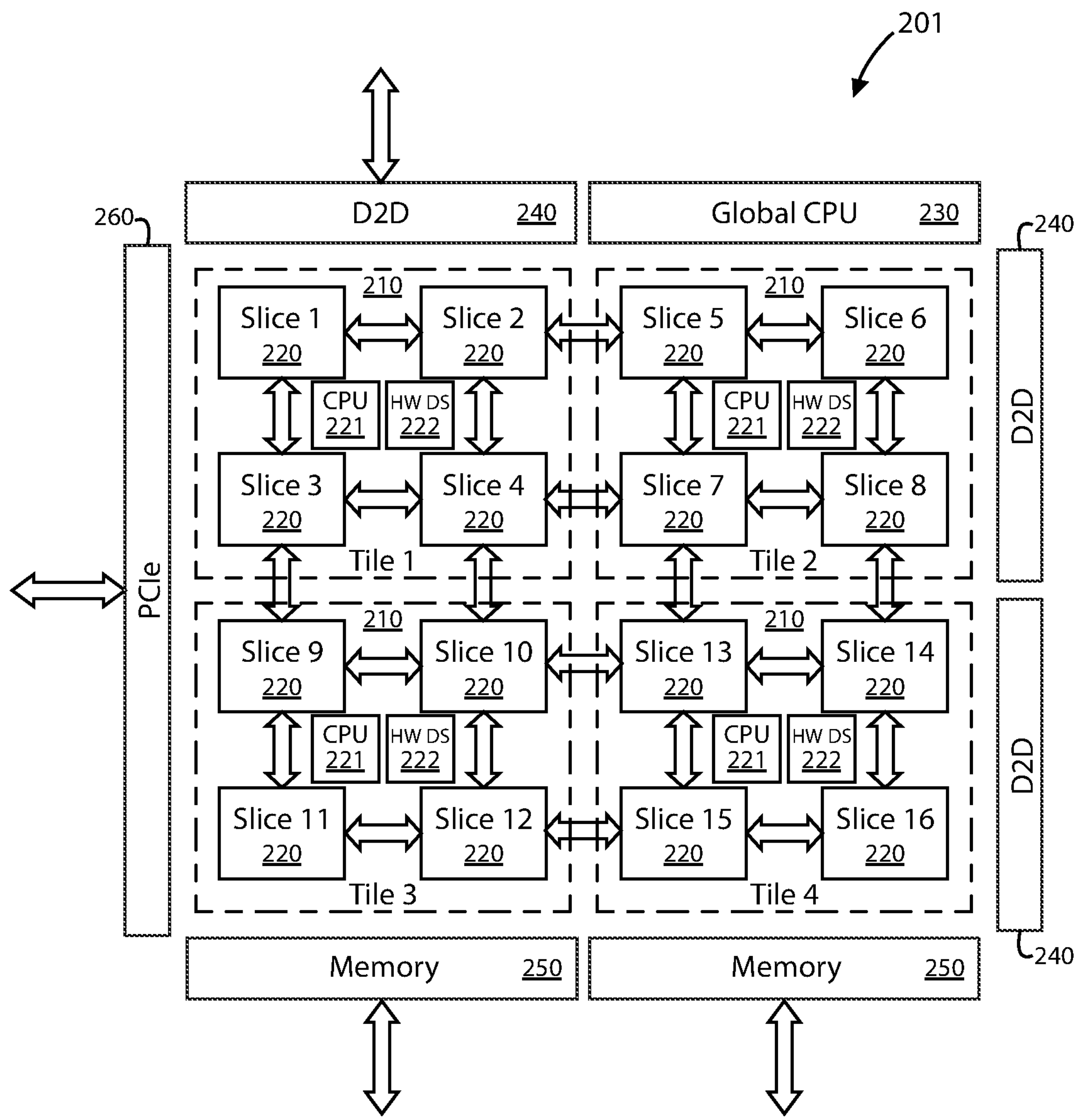
FIGS. 2A-2D are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
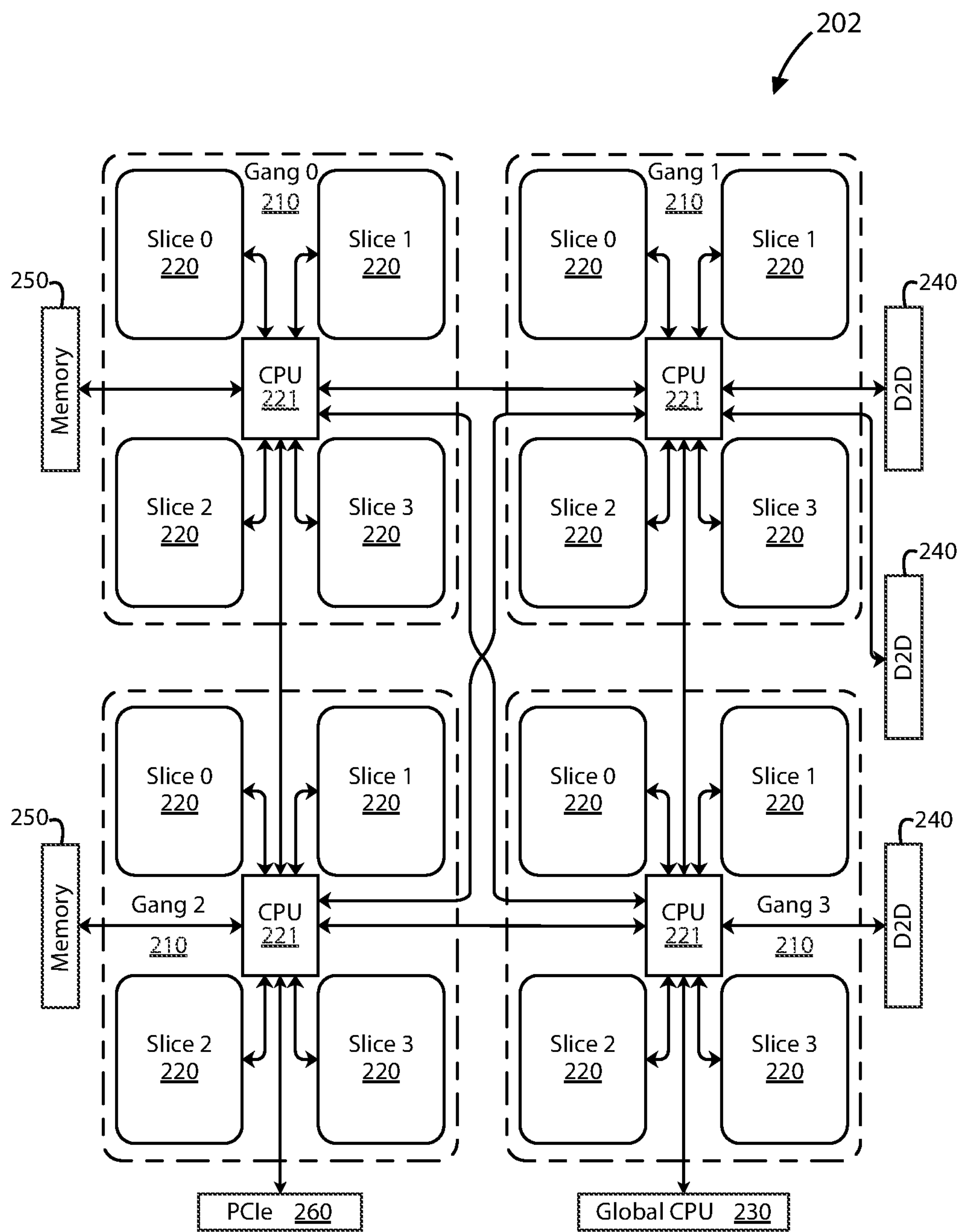

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 2C:
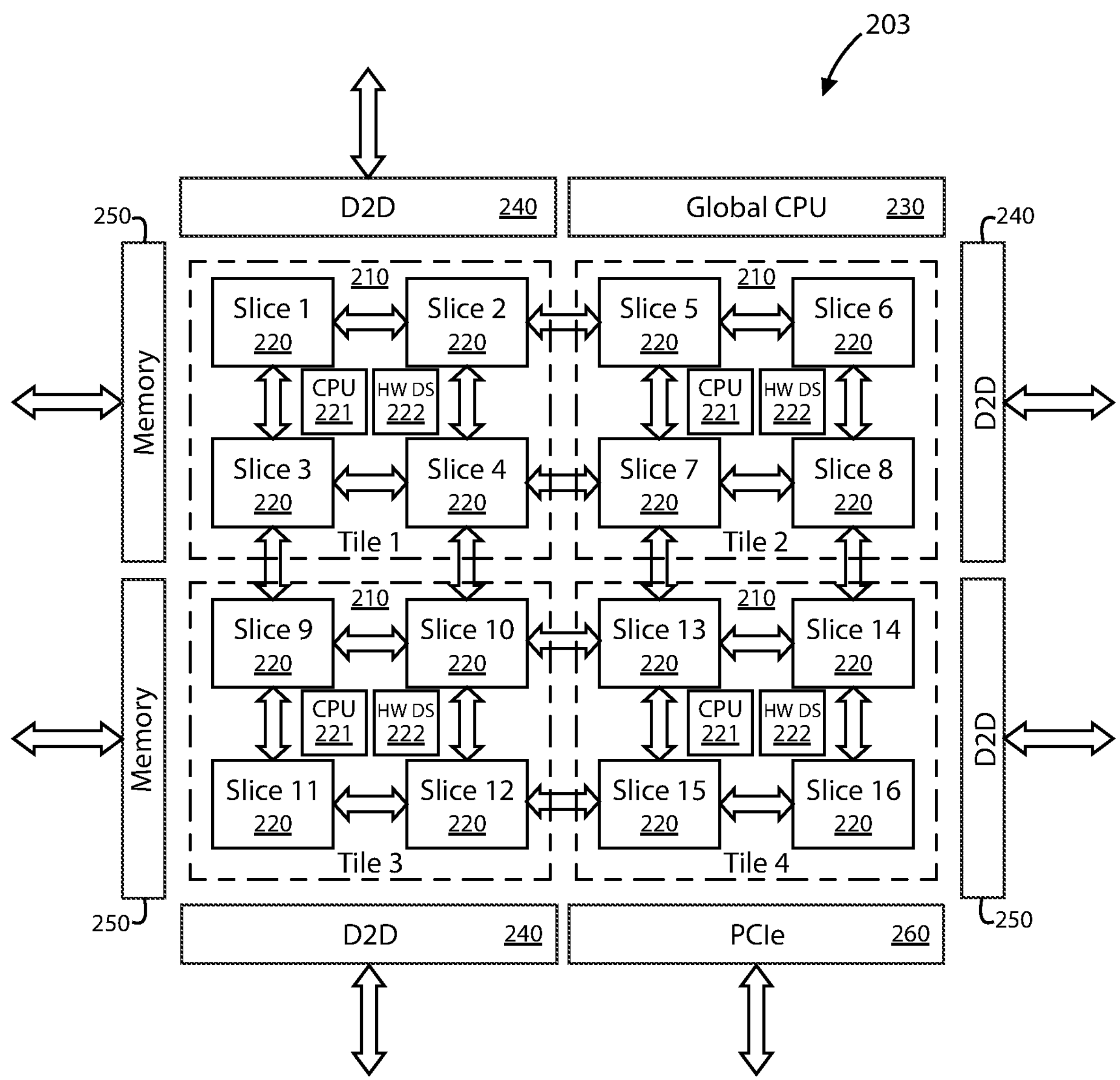

FIG. 2C is a simplified block diagram illustrating an example configuration of a 16-slice chiplet device 203. Chiplet 203 is similar to chiplet 201, except that the positions of the D2D interconnects 240, the memory interface 250, and the PCIe interface 260 are in a different configuration. Here, a first input/output (I/O) region includes (shown at the top) includes one or more D2D interconnects 240 and the global CPU interface 230, and a second I/O region (shown to the right) includes one or more D2D interconnects 240 as well. In chiplet 203, a third I/O region (shown at the bottom) includes one or more D2D interconnects 240 and a PCIe interface 260, whereas chiplet 201 had one or more memory interface connections 250 in this region. And, a fourth I/I region (shown to the left) includes one or more memory interface connections 250, whereas chiplet 201 had the PCIe interface 260 in this region. In an example, these I/O regions are placed in a symmetrical configuration. The I/O placement of chiplet 203 can be used in a single die configuration for various chiplet configurations (e.g., 1×2, 2×2, 2×4, etc.). Further, the I/O placement is optimized for various array configurations due to die rotations not affecting the package I/O routing (i.e, enables scalable chiplet array configurations in any die orientation).

Figure 2D:
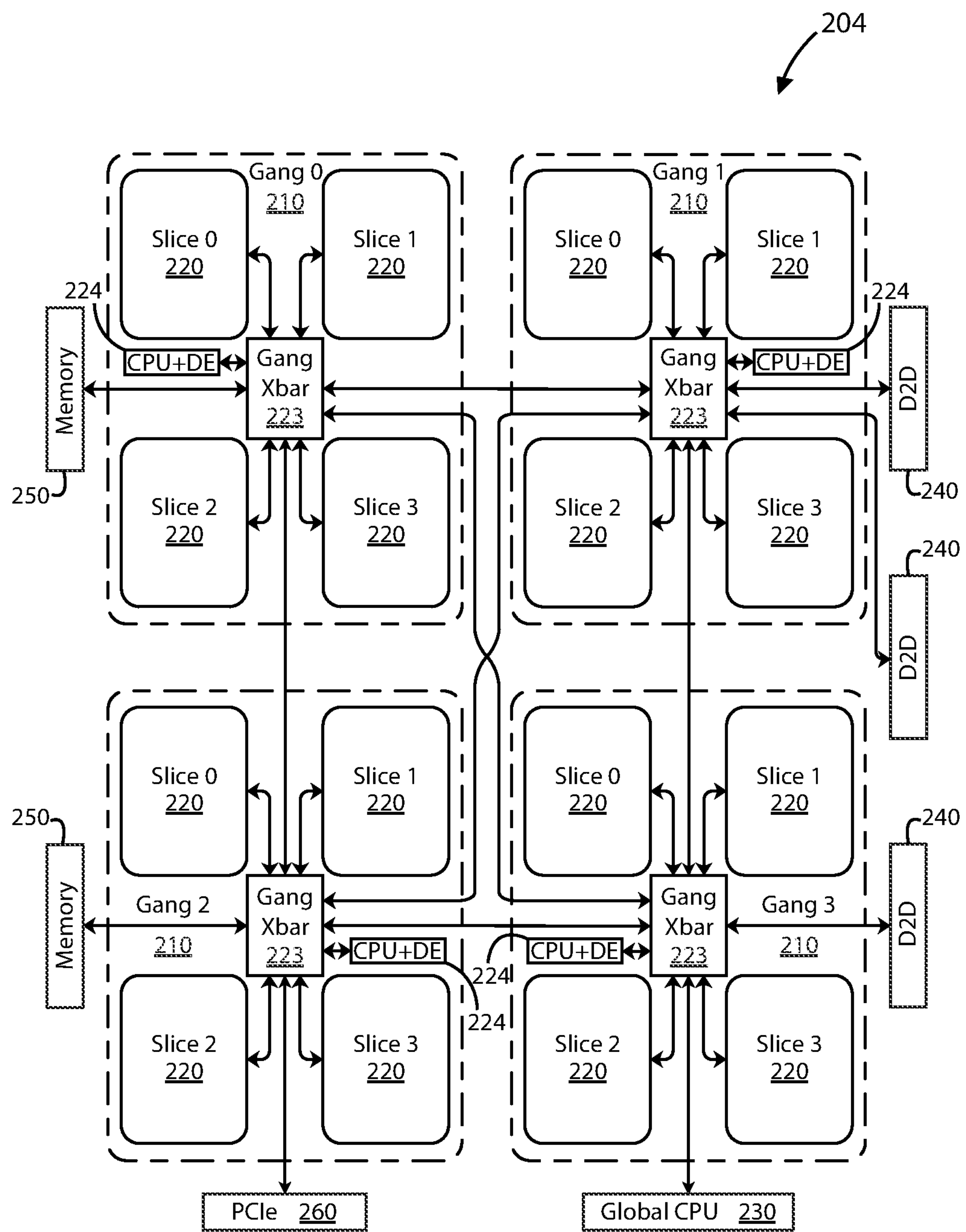

FIG. 2D is a simplified block diagram illustrating an example configuration of a 16-slice chiplet device 204. Similar to chiplet 202, chiplet 204 includes four gangs 210 (or tiles), each of which includes four slice devices 220. However, in this case, each of the slice devices 220 within each gang are coupled to a gang crossbar device 223, which is coupled to a gang CPU and dispatch engine device 224. Those of ordinary skill in the art will recognize other variations, modifications, and alternatives to the configurations shown in FIGS. 2A-2D.

Figure 3A:
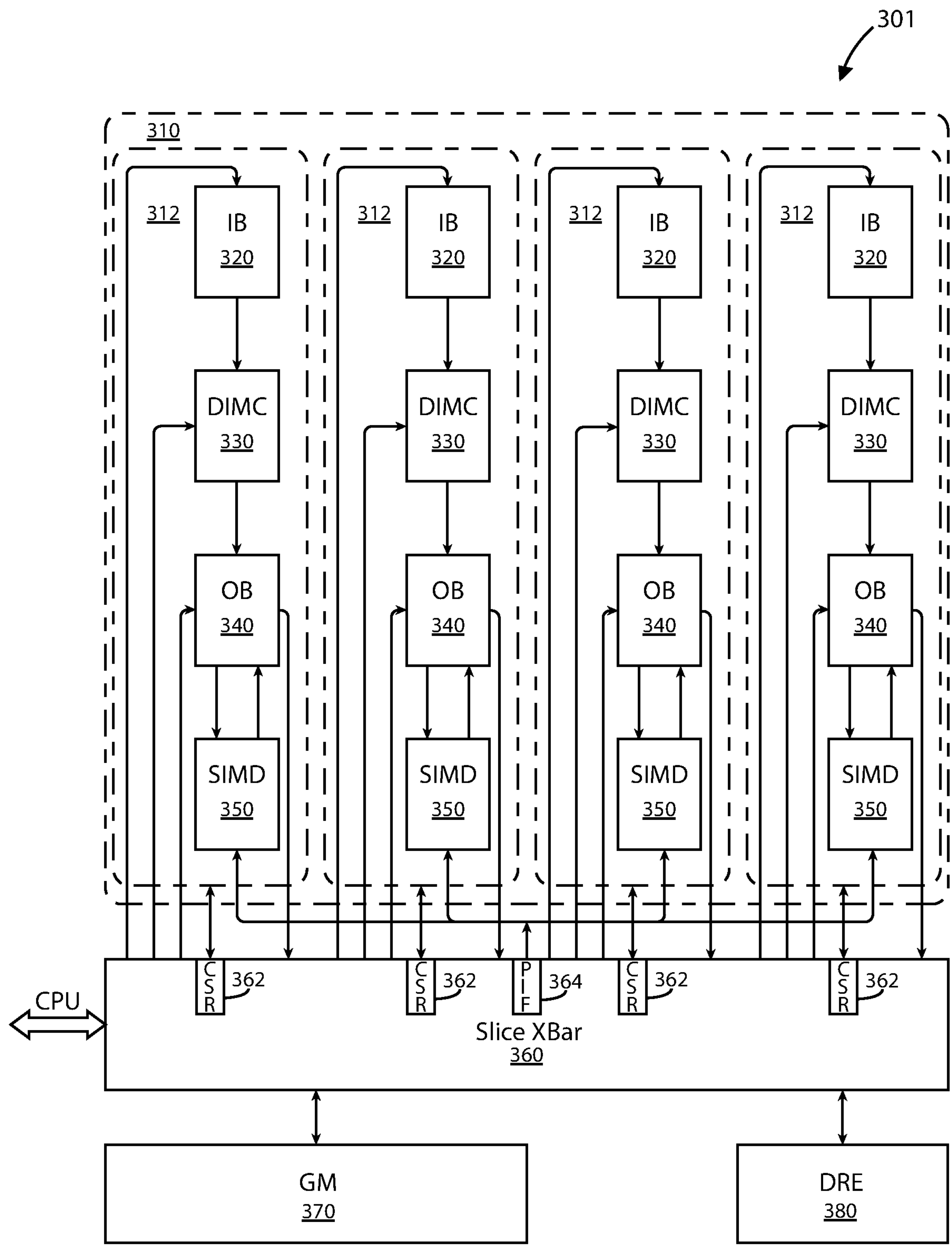
FIGS. 3A-B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
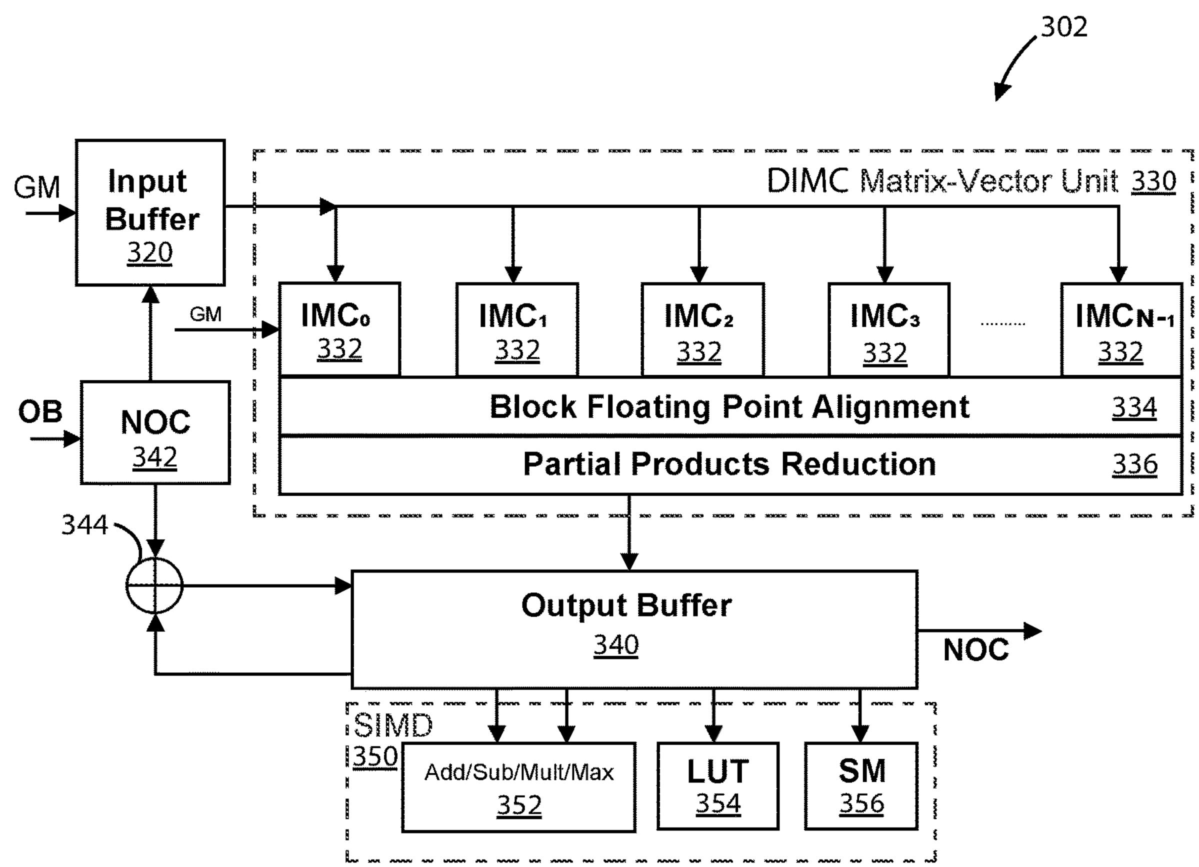

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can includes a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations. These slice components can vary depending on which transformer the AI accelerator apparatus will serve.

Figure 4:
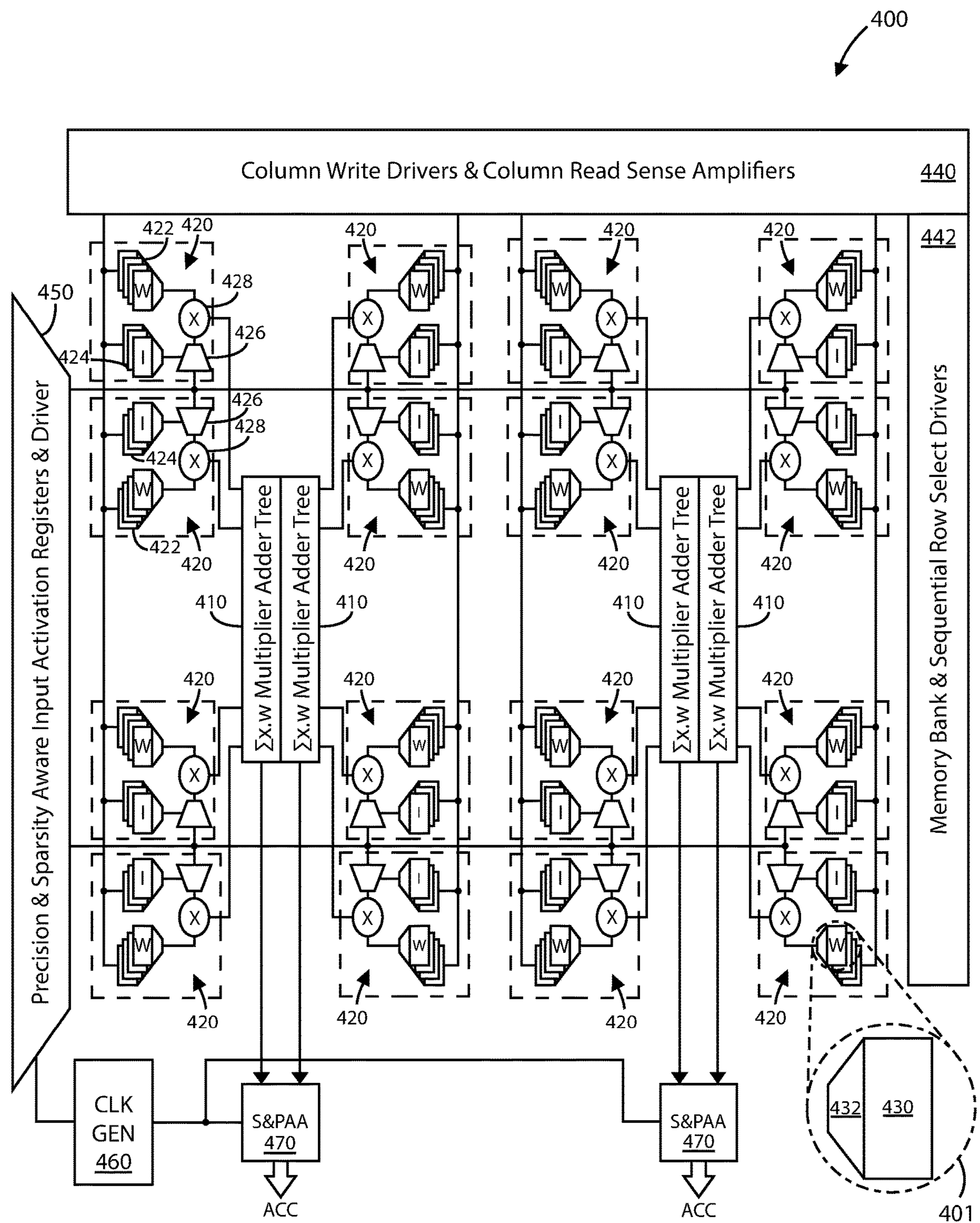
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., $\Sigma x \cdot w$).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410. Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
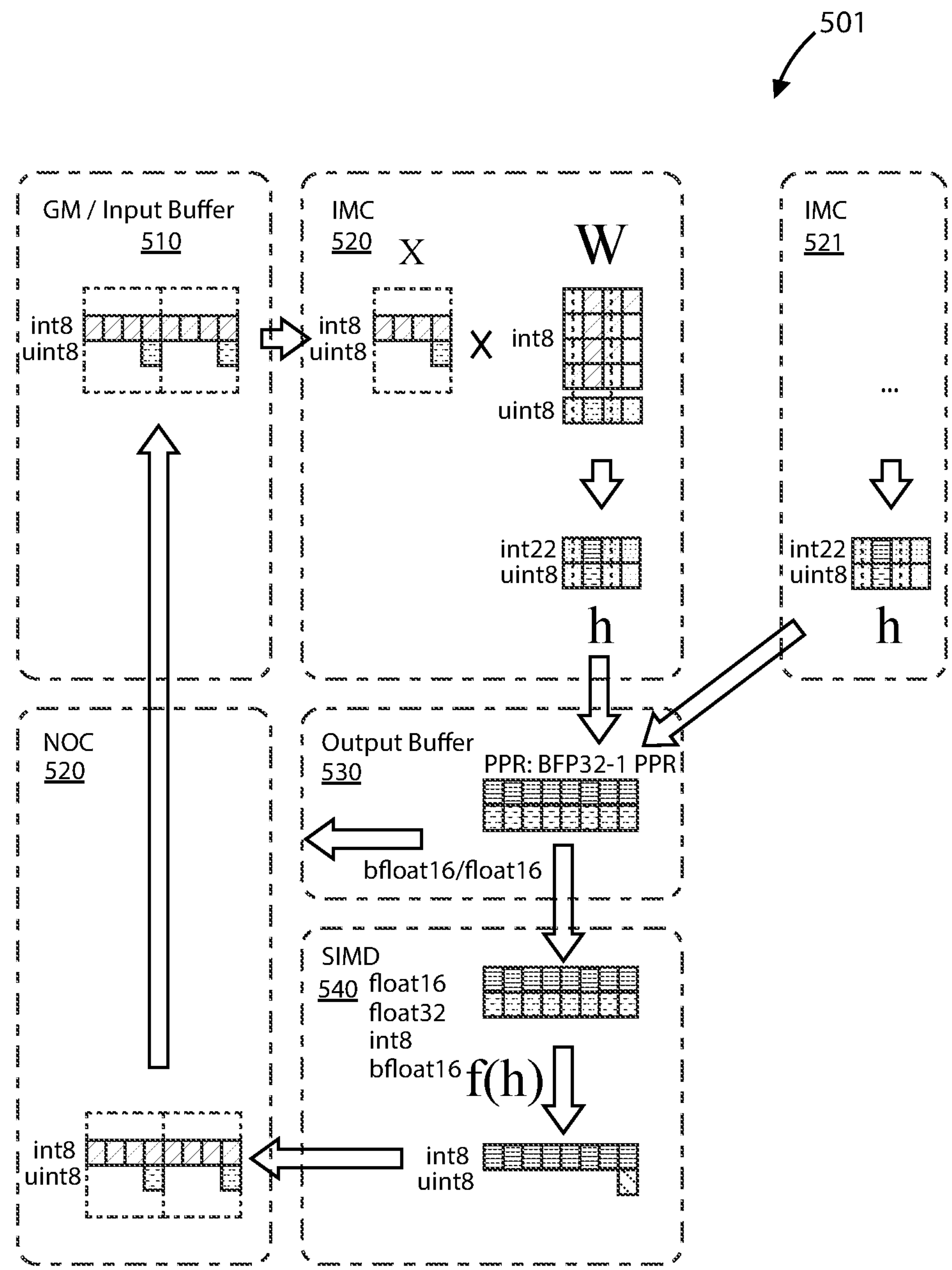
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer 530, the SIMD 540, and the NoC 550, which feeds back to the GM/input buffer 510. The IMC block 520 shows the multiply-accumulate operation ($\Sigma x \cdot w$). Additionally, the format for the data from IMC 532 flows to the output buffer 530 as well. In this example, the numerical formats include integer (int), floating point (float), and block floating (bfloat) of varying lengths.

Figure 5B:
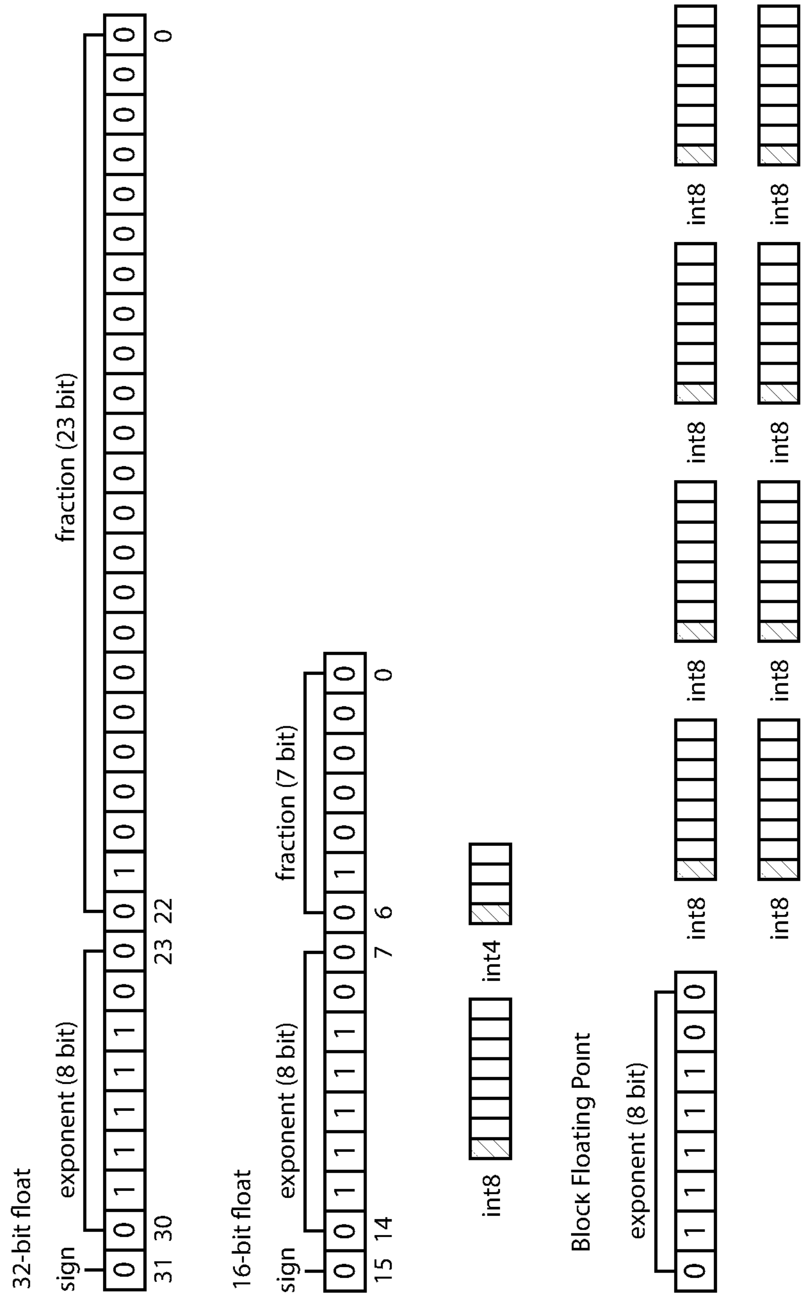
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for training can exhibit the efficiency of fixed point without the problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6:
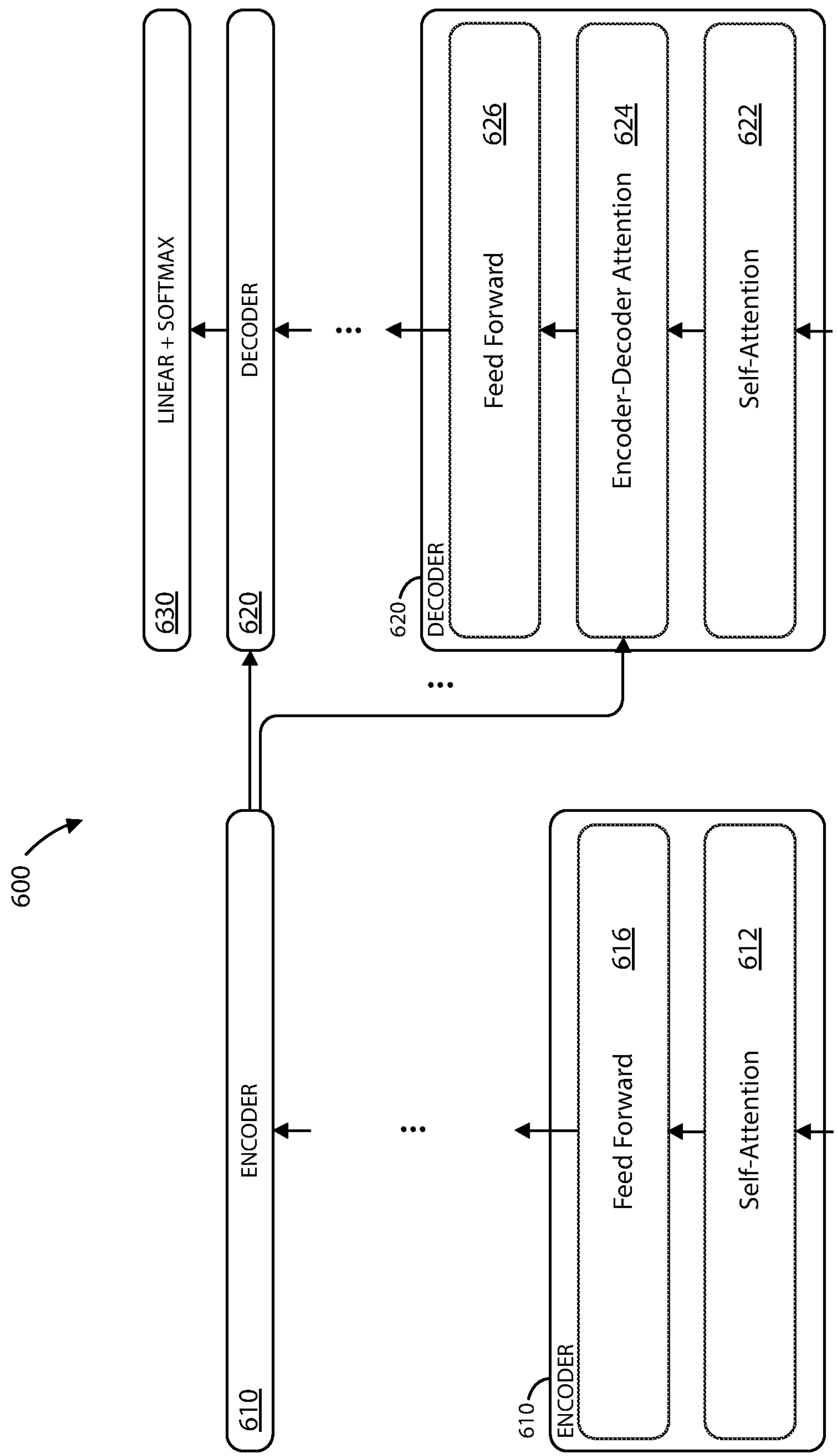
FIG. 6 is a simplified block diagram of a transformer architecture.

FIG. 6 illustrates a simplified transformer architecture 600. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 uses the attention vectors from the encoder stack that aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the this probability output, the projected word meaning may be chosen based on the highest probability or by other derived criteria depending on the application.

Transformer model variations include those based on just the decoder stack (e.g., transformer language models such as GPT-2, GPT-3, etc.) and those based on just the encoder stack (e.g., masked language models such as BERT, BERT Large, etc.). Transformers are based on four parameters: sequence length (S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

Figure 7:
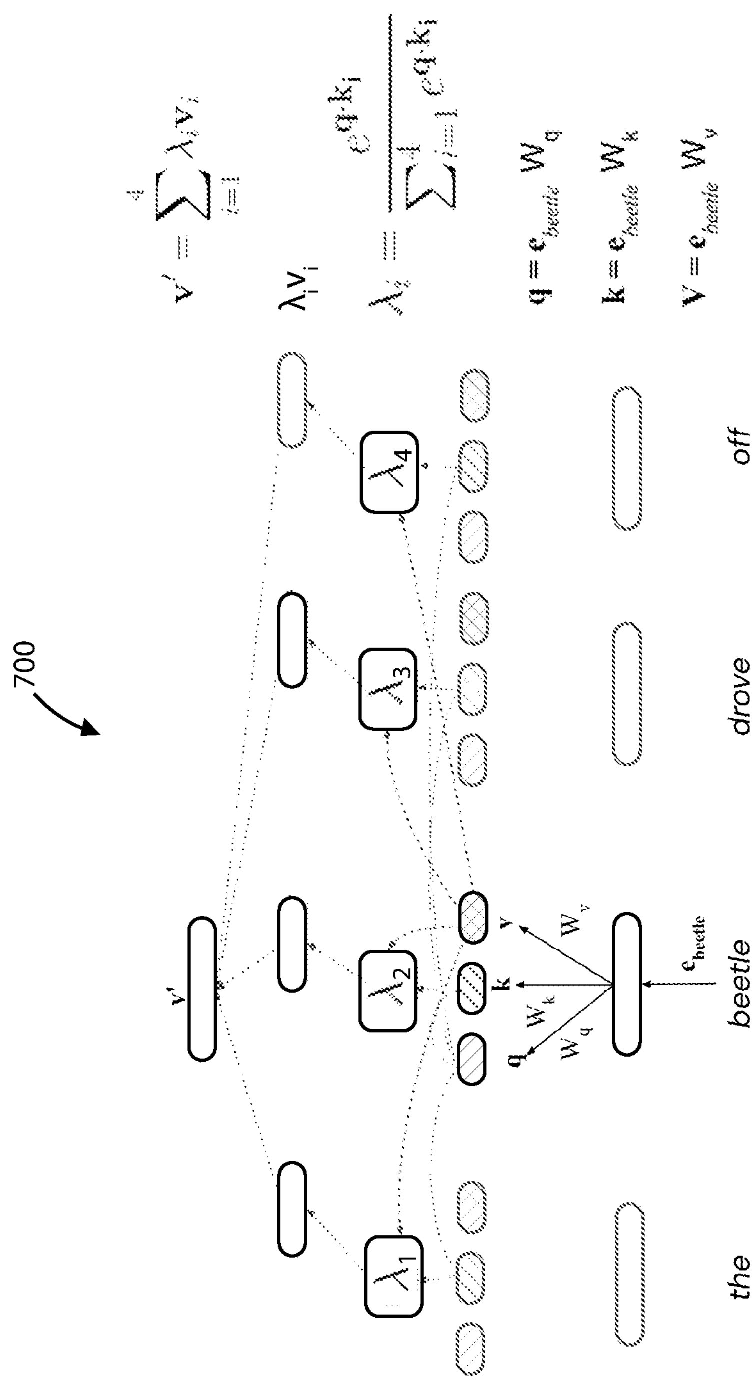
FIG. 7 is a simplified diagram illustrating a self-attention layer process for an example NLP model.

The self-attention process includes (1) determining query (Q), key (K), and value (V) vectors for the embedding of each word in an input sentence, (2) calculating a score for from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output. An example self-attention process 700 is shown in FIG. 7.

As shown, process 700 shows the evaluation of the sentence "the beetle drove off" at the bottom to determine the meaning of the word "beetle" (e.g., insect or automobile). The first step is to determine the $q_{bettle}$, $k_{beetle}$, and $v_{beetle}$ vectors for the embedding vector $e_{beetle}$. This is done by multiplying $e_{beetle}$ by three different pre-trained weight matrices $W_q$, $W_k$, and $W_v$. The second step is to calculate the dot products of $q_{beetle}$ with the K vector of each word in the sentence (i.e., $k_{the}$, $k_{beetle}$, $k_{drove}$, and $k_{off}$), shown by the arrows between $q_{beetle}$ and each K vector. The third step is to divide the scores by the square root of the dimension $d_k$, and the fourth step is to normalize the scores using a softmax function, resulting in $\lambda_i$. The fifth step is to multiply the V vectors by the softmax score ($\lambda_i v_i$) in preparation for the final step of summing up all the weight value vectors, shown by v' at the top.

Process 700 only shows the self-attention process for the word "beetle", but the self-attention process can be performed for each word in the sentence in parallel. The same steps apply for word prediction, interpretation, translation, and other inference tasks. Further details of the self-attention process in the BERT Large model are shown in FIGS. 8 and 9.

Figure 8:
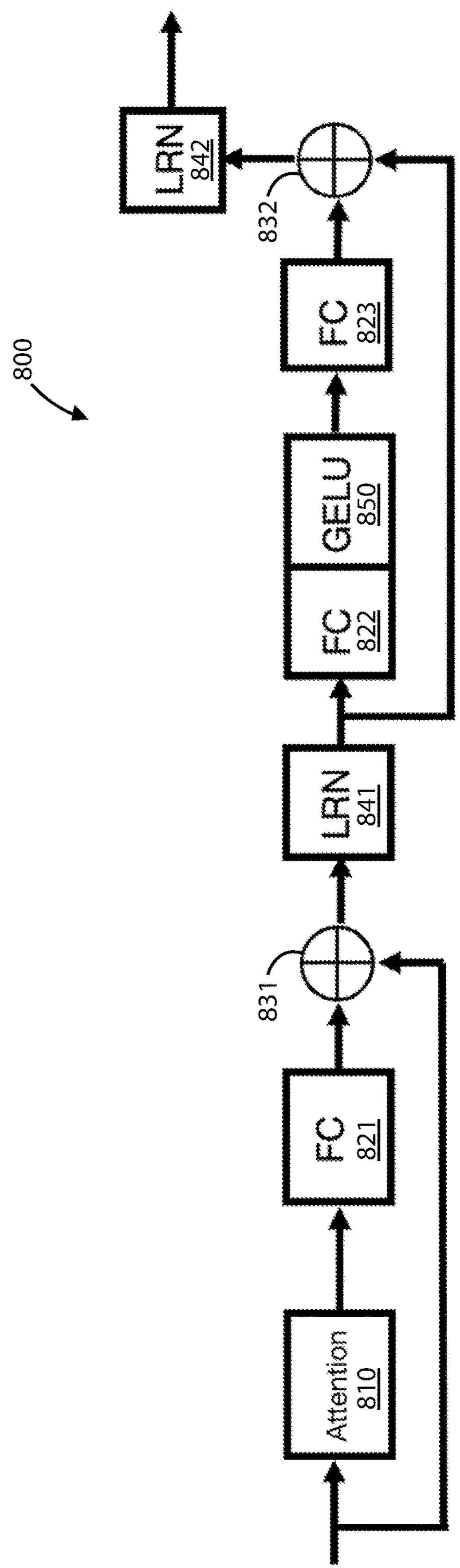
FIG. 8 is a simplified block diagram illustrating an example transformer.

A simplified block diagram of the BERT Large model (S=384, A=16, L=34, and H=1024) is shown in FIG. 8. This figure illustrates a single layer 800 of a BERT Large transformer, which includes an attention head device 810 configured with three different fully-connected (FC) matrices 821-823. As discussed previously, the attention head 810 receives embedding inputs (384×1024 for BERT Large) and measures the probability distribution to come up with a numerical value based on the context of the surrounding words. This is done by computing different combination of softmax around a particular input value and producing a value matrix output having the attention scores.

Figure 9:
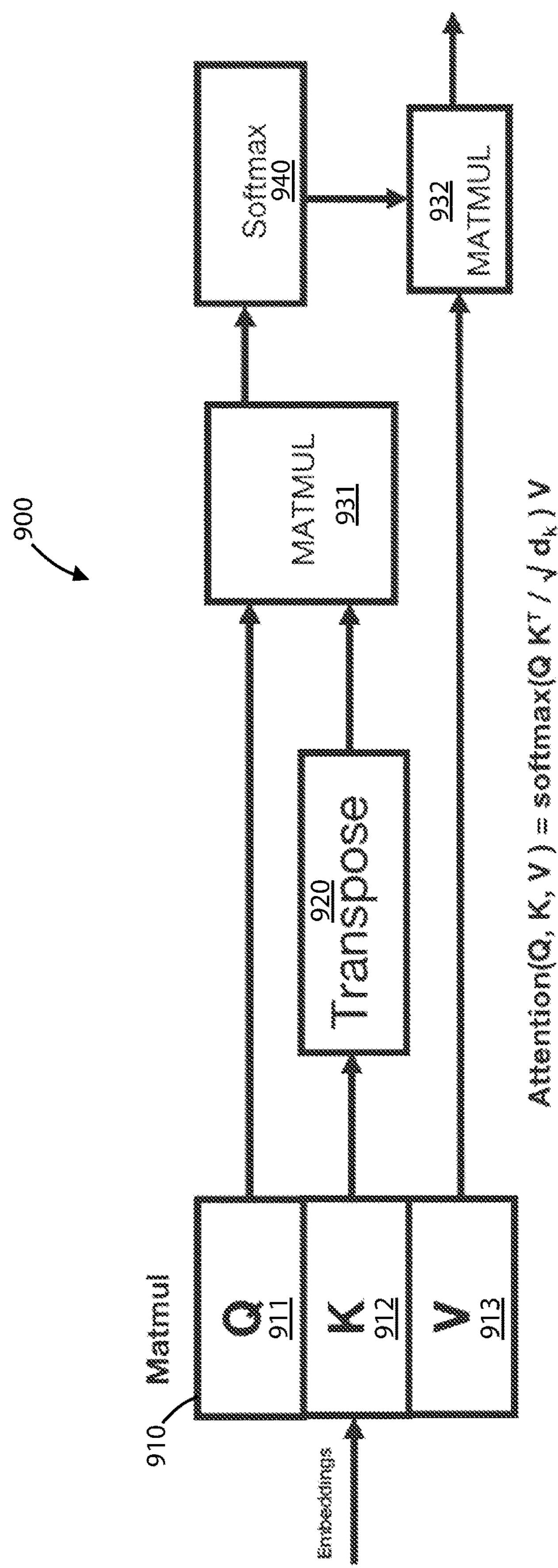
FIG. 9 is a simplified block diagram illustrating an attention head layer of an example transformer.

Further details of the attention head 810 are provided in FIG. 9. As shown, the attention head 900 computes a score according to an attention head function: Attention(Q, K, V)=softmax($QK^T/\sqrt{d_k}$)V. This function takes queries (Q), keys (K) of dimension $d_k$, and values (V) of dimension $d_k$ and computes the dot products of the query with all of the keys, divides the result by a scaling factor $\sqrt{d_k}$ and applies a softmax function to obtain the weights (i.e., probability distribution) on the values, as shown previously in FIG. 7.

The function is implemented by several matrix multipliers and function blocks. An input matrix multiplier 910 obtains the Q, K, and V vectors from the embeddings. The transpose function block 920 computes $K^T$, and a first matrix multiplier 931 computes the scaled dot product $QK^T/\sqrt{d_k}$. The softmax block 940 performs the softmax function on the output from the first matrix multiplier 931, and a second matrix multiplier 932 computes the dot product of the softmax result and V.

For BERT Large, 16 such independent attention heads run in parallel on 16 AI slices. These independent results are concatenated and projected once again to determine the final values. The multi-head attention approach can be used by transformers for (1) "encoder-decoder attention" layers that allow every position in the decoder to attend over all positions of the input sequence, (2) self-attention layers that allows each position in the encoder to attend to all positions in the previous encoder layer, and (3) self-attention layers that allow each position in the decoder to attend to all positions in the decoder up to and including that position. Of course, there can be variations, modifications, and alternatives in other transformer.

Returning to FIG. 8, the attention score output then goes to a first FC matrix layer 821, which is configured to process the outputs of all of the attention heads. The first FC matrix output goes to a first local response normalization (LRN) block 841 through a short-cut connection 830 that also receives the embedding inputs. The first LRN block output goes to a second FC matrix 822 and a third FC matrix 823 with a Gaussian Error Linear Unit (GELU) activation block 850 configured in between. The third FC matrix output goes to a second LRN block 842 through a second short-cut connection 832, which also receives the output of the first LRN block 841.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers comprises a plurality of matrix multipliers including QKV matrices configured for an attention layer of a transformer followed by three fully-connected matrices (FC). In this configuration, the DIMC is configured to accelerate the transformer and further comprises a dot product of Q $K^T$ followed by a softmax (Q $K^T$/square root ($d_k$))V. In an example, the AI accelerator apparatus is also includes a SIMD device (as shown in FIGS. 3A and 3B) configured to accelerate a computing process of the softmax function.

According to an example, the present invention provides for methods of compiling the data representations related to transformer-based models mapping them to an AI accelerator apparatus in a spatial array. These methods can use the previously discussed numerical formats as well as sparsity patterns. Using a compile algorithm, the data can be configured to a dependency graph, which the global CPU can use to map the data to the tiles and slices of the chiplets. Example mapping methods are shown in FIGS. 10-13B.

Figure 10:
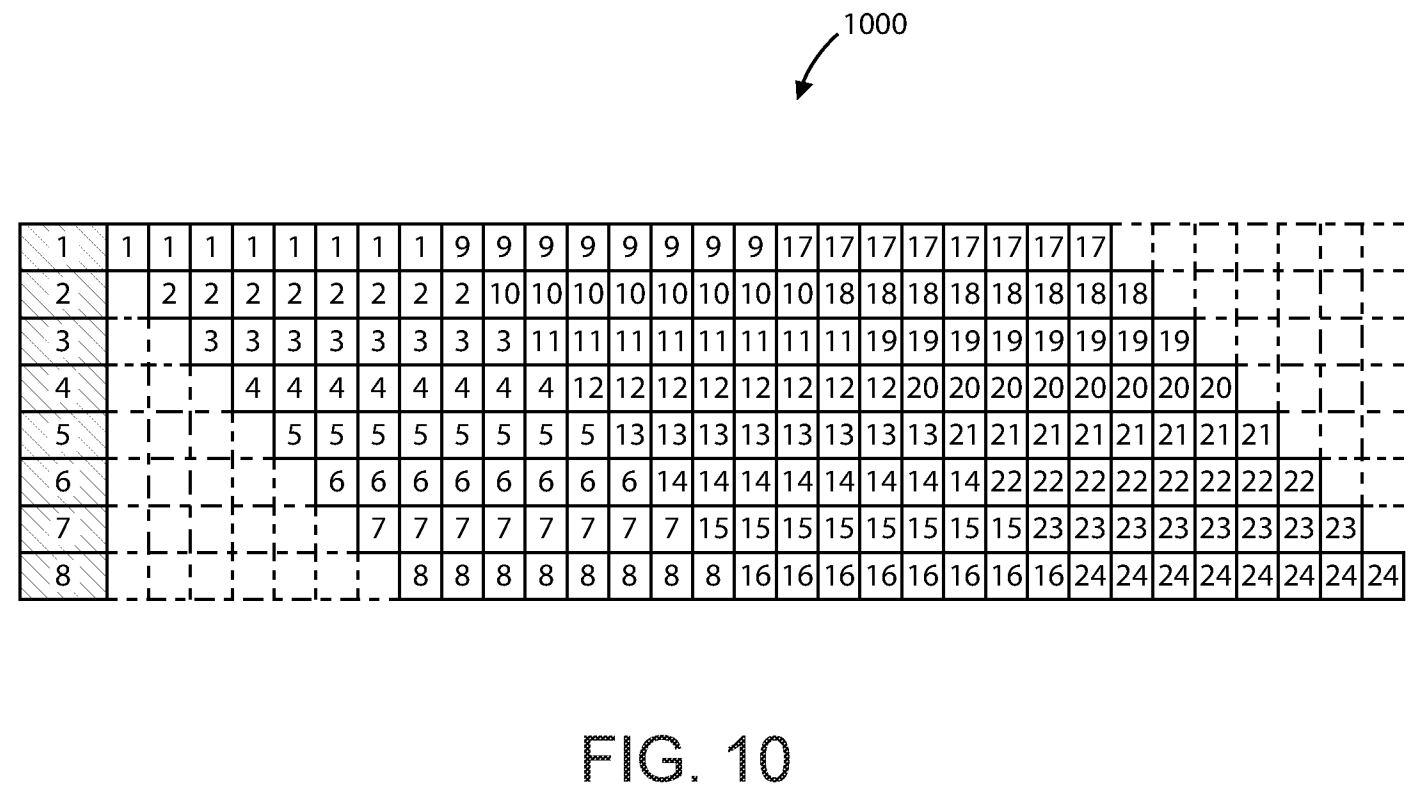

FIG. 10 is a simplified table representing an example mapping process between a 24-layer transformer and an example eight-chiplet AI accelerator apparatus. As shown, the chiplets are denoted by the row numbers on the left end and the model layers mapped over time are denoted by the table entry numbers. In this case, the 24 layers of the transformer (e.g., BERT Large) are mapped to the chiplets sequentially in a staggered manner (i.e., first layer mapped onto the first chiplet, the second layer mapped onto the second chiplet one cycle after the first, the third layer mapped onto the third chiplet two cycles after the first, etc.) After eight cycles, the mapping process loops back to the first chiplet to start mapping the next eight model layers.

Figure 11:
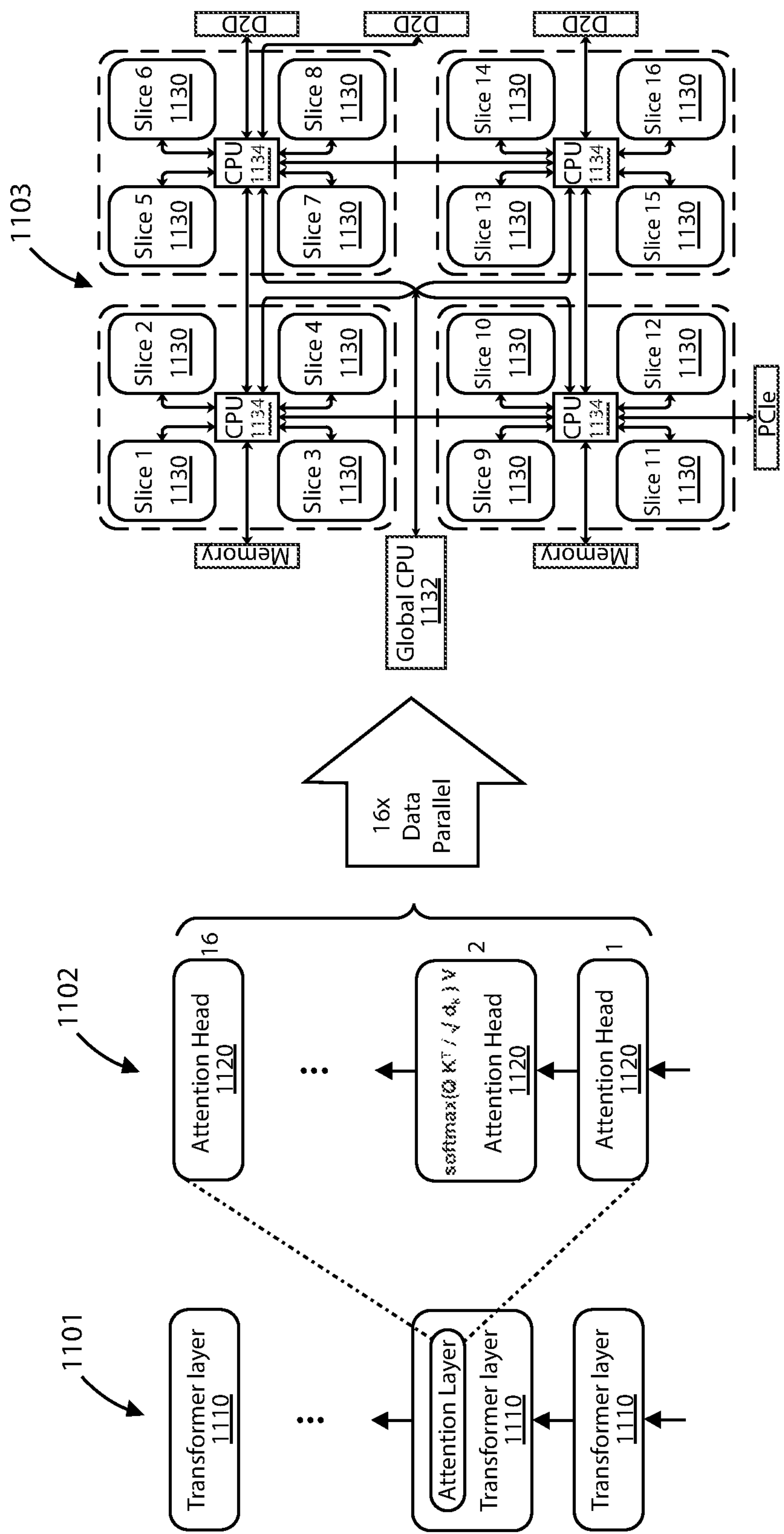
FIG. 11 is a simplified block flow diagram illustrating a mapping process between a transformer and an AI accelerator apparatus according to an example of the present invention.

FIG. 11 is a simplified block flow diagram illustrating a mapping process between a transformer and an example AI accelerator apparatus. As shown, a transformer 1101 includes a plurality of transformer layers 1110, each having an attention layer 1102. In this case, there are 16 attention heads 1110 (e.g., BERT Large) computing the attention function as discussed previously. These 16 attention heads are mapped to 16 slices 1130 of an AI accelerator apparatus 1103 (similar to apparatuses 201 and 202) via global CPU 1132 communicating to the slice CPUs 1134.

Figure 12:
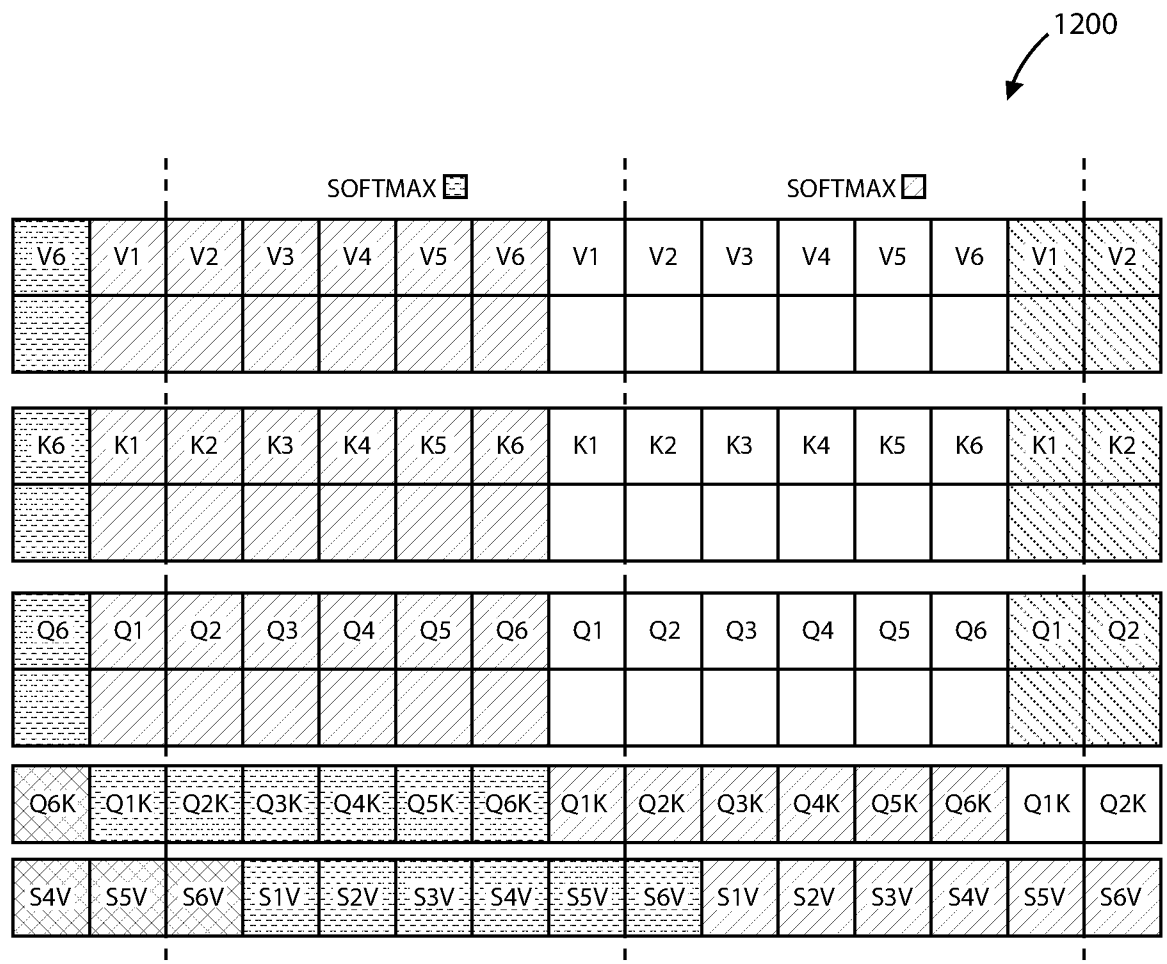
FIG. 12 is a simplified table representing a tiling attention process of a transformer to an AI accelerator apparatus according to an example of the present invention.

FIG. 12 is a simplified table representing an example tiling attention process between a transformer and an example AI accelerator apparatus. Table 1200 shows positions of Q, K, and V vectors and the timing of the softmax performed on these vectors. The different instances of the softmax are distinguished by fill pattern (e.g., diagonal line filled blocks representing Q, K, V vectors and diagonal line filled blocks representing Q-K and Softmax-V dot products).

In an example, the embedding E is a [64L, 1024] matrix (L=6 for sentence length of 384), and $E_i$ is a [64, 1024] submatrix of E, which is determined as $E_i = E_{(64i-63):(64i),\ 1:1024}$, where i=1 . . . L. Each of the K and Q matrices can be allocated to two slices (e.g., @[SL1:AC3,4]: $K_i \leftarrow E_i \times K_{1\ldots 1024,\ 1\ldots 64}$; and @[SL1:AC1,2]: $Q_i \leftarrow E_i \times Q_{1\ldots 1024,\ 1\ldots 64}$). An example data flows through IMC and SIMD modules are shown in the simplified tables of FIGS. 13A-13C.

FIG. 13A shows table 1301 representing mapping self-attention to an AI slice according to an example of the present invention. The left side shows the IMC cycles for matrix multiplications performed by IMC modules AC1-AC4, while the right side shows SIMD cycles for element-wise computations performed by SIMD modules SIMD1-SIMD4. In this example, the IMC modules determine the key vectors K1-K6 (a[64×512]; w[512×64]; o[64×64]), and query vectors Q1-Q6 (a[64×512]; w[512×64]; o[64×64]), followed by the transpose QKT1-QKT6 (a[64×64]; w[64×384]; o[64×384]). Then, the SIMD modules compute the softmax Smax1-Smax6 (a[64×384]). Meanwhile, the IMC modules determine the value vectors V1-V6 (a[64×512]; w[512×64]; o[64×64]), followed by the multiplication of the value vectors and the softmax results.

FIG. 13B shows table 1302 representing mapping dense embedding vectors and the second FC matrix to an AI slice (left: IMCs; right: SIMDs) according to an example of the present invention. In this example, the IMCs process the embedding vectors E1-E6 (a[64×512]; w[512×64]; o[64×64]), which corresponds to the path from the attention head 810 to the second FC matrix 822 in FIG. 8. Following the processing of each embedding vector E, the SIMDs process the GELU (a[64×64]), which corresponds to the path through the first LRN block 841 and the GELU block 850 in FIG. 8.

FIG. 13C shows table 1303 representing mapping the third FC matrix to an AI slice (left: IMCs; right: SIMDs) according to an example of the present invention. In this example, the IMCs process the results through the second FC matrix, which corresponds to the path through the third FC matrix 823 and the second LRN block 842 in FIG. 8. Those of ordinary skill in the art will recognize other variations, modifications, and alternatives to the mappings shown in FIGS. 10-13C.

According to various examples, the present invention also provides for three-dimensional (3D) stacking methods and configurations for AI accelerator apparatuses, chiplet devices, and related components. As the scope of transformer workloads expand, memory and interconnect bandwidths limit the performance of processing these workloads. Depending on the embodiment, the present 3D stacking methods and configurations can have significant advantages, such as improvement in bandwidth and power performance over conventional embodiments, reduction in number of cards required in serving systems, and low-cost fabrication processes.

Figure 14A:
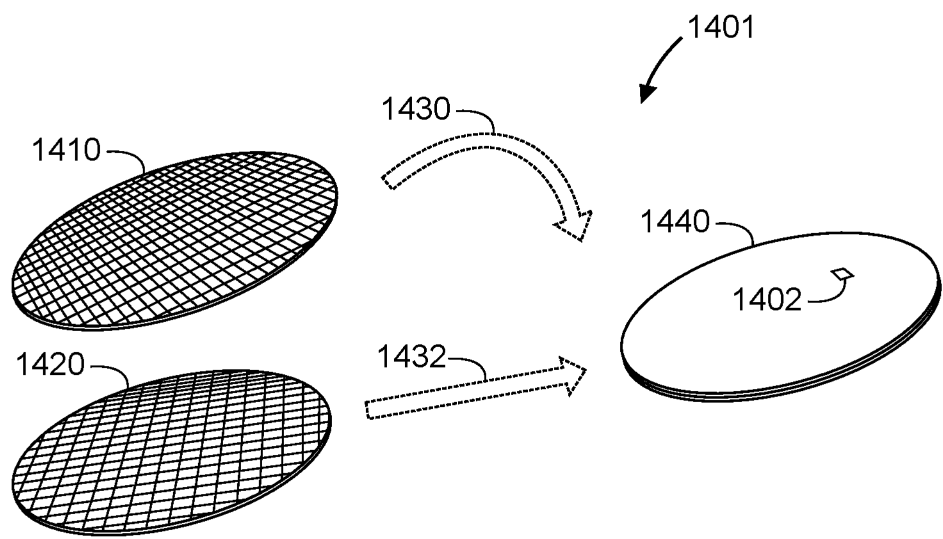
FIGS. 14A and 14B shows a simplified diagram illustrating a method of forming a stacked wafer apparatus according to an example of the present invention.
Figure 14B:
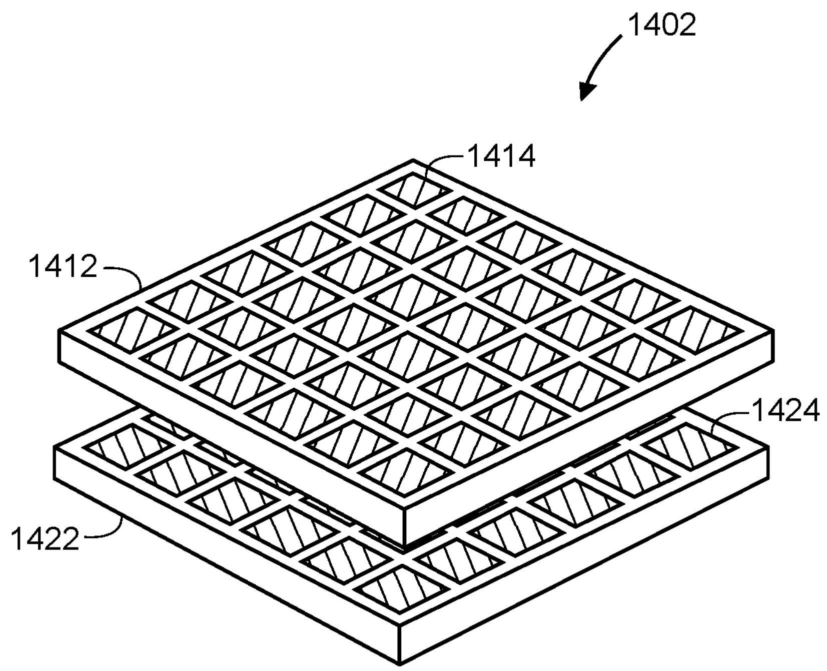

FIGS. 14A and 14B shows a simplified diagram illustrating a method of forming a stacked wafer apparatus according to an example of the present invention. As shown in FIG. 14A, the method 1401 starts with a memory wafer 1410 (e.g., DRAM wafer, or the like) having a plurality of memory dies (e.g., DRAM dies, or the like) formed overlying and a logic wafer 1420 having a plurality of logic dies formed overlying. Each of the logic dies can include the previously discussed AI accelerator apparatuses, chiplet devices, or related components formed overlying. Here, the memory wafer 1410 is rotated face down (shown by dotted arrow 1430) and bonded overlying the logic wafer 1420, which is kept in its original orientation (shown by dotted arrow 1432). The resulting bonded wafers 1440 will have a plurality of bonded dies 1402 (only one shown for clarity) that have a memory die bonded face down overlying a logic die. Alternatively, the logic wafer 1420 can be rotated face down and bonded overlying the memory wafer 1410. In a specific example, the method can include a three-dimensional (3D) logic-to memory hybrid bonding process. FIG. 14B shows an example bonded die more closely.

As shown in FIG. 14B, the bonded die 1402 includes a memory die 1412 having a plurality of memory devices 1414 and a logic die 1422 having a plurality of logic devices 1424. In this figure, the components are shown in an exploded view and the memory devices 1414 are visible from the topside surface region for clarity. In this configuration, the bonded die 1402 will have a plurality of bonded devices having at least a memory device 1414 bonded to a logic device 1424. In an example, the logic device 1424 can include an AI accelerator apparatuses, a chiplet device, or related components formed overlying a first substrate. Also, the memory device 1414 can include one or more memory units (e.g., DDR DRAM devices, or the like) formed overlying a second substrate, which is mechanically and operably bonded to the first substrate and configured to a memory interface (e.g., DRAM interface, or the like) of the AI accelerator apparatus, chiplet device, etc.

Or, the second semiconductor substrate can include a plurality of DRAM memory cells, one of more of the plurality of DRAM memory cells being coupled to the DRAM interface such that the first semiconductor substrate and the second semiconductor substrate are bonded through a mechanical interface. Further, a substrate member can be configured to provide mechanical support and having a surface region, the surface region being coupled to support the chiplet and memory device. In an example, these substrates can be semiconductor substrates or the like. Further, the resulting bonded device can include 3D stacked devices, such as a 3D stacked chiplet and memory device, or the like. Those of ordinary skill in the art will recognize other variations, modifications, and alternatives.

Figure 14C:
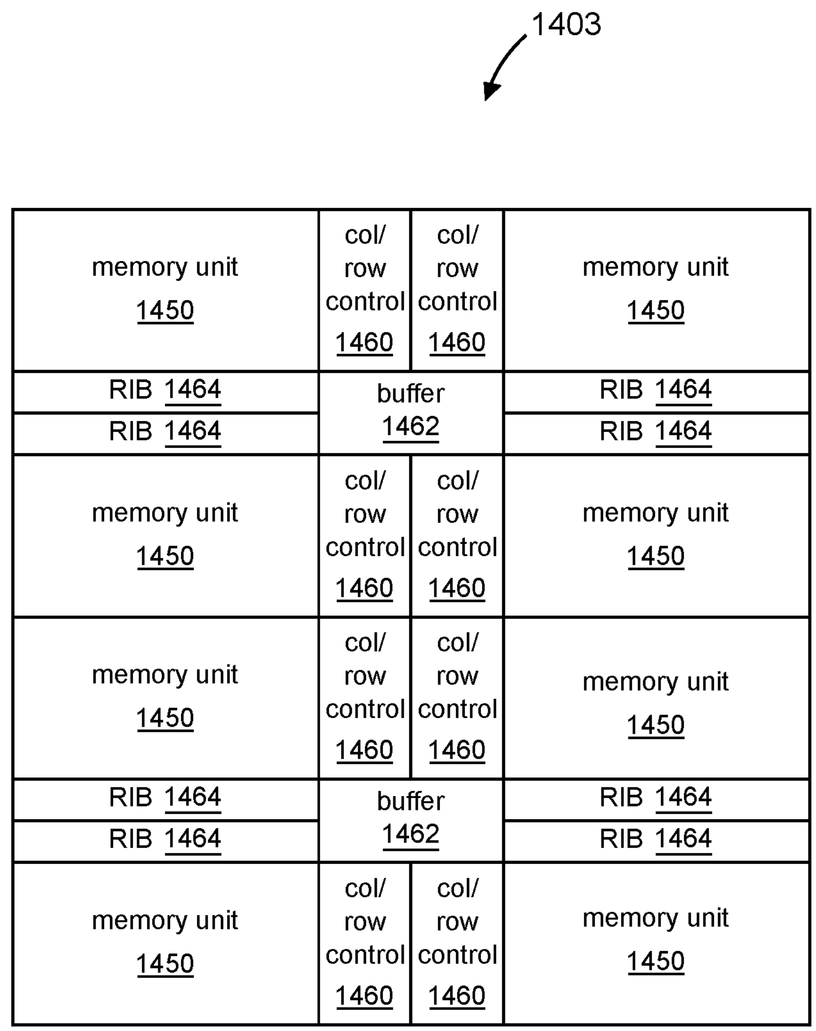
FIG. 14C is a simplified block diagram illustrating a memory device according to an example of the present invention.

FIG. 14C is a simplified block diagram illustrating a memory device according to an example of the present invention. As shown, the memory device 1403 includes at least one or more memory units 1450 (e.g., memory banks, or the like), row/column control units 1460, buffer units 1462, and routing information base (RIB) units 1464. Here, each memory unit 1450 is coupled to and configured with a control unit 1460 and a RIB unit 1464, and each buffer unit 1462 is coupled to and configured with four such memory units 1450, control units 1460, and RIB units 1464. In a specific example, this memory device 1403 can be a DRAM core device with eight memory banks and on-chip Error Correction Code (ECC). Of course, there can be other variations, modifications, and alternatives.

Figure 15:
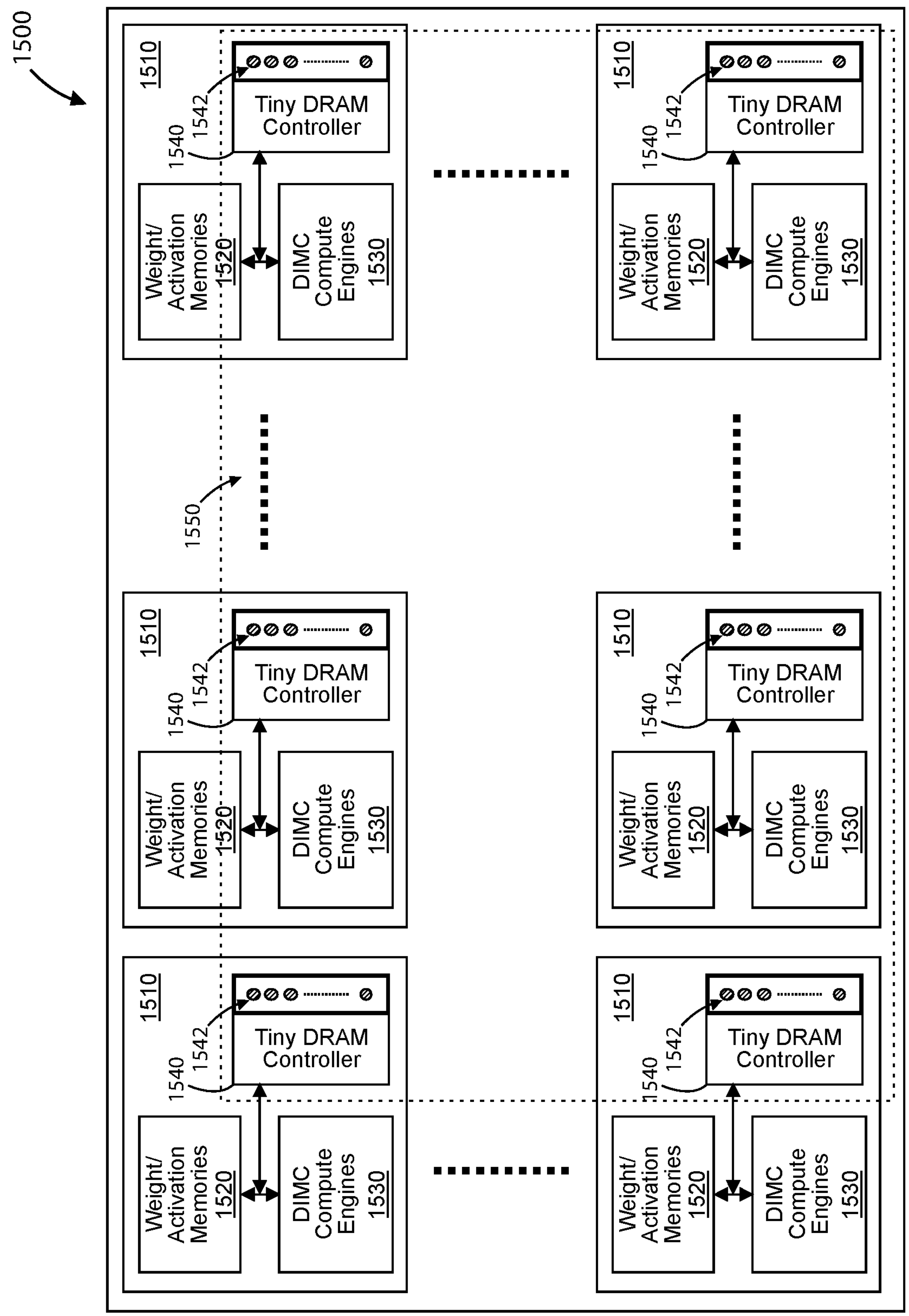
FIG. 15 is a simplified block illustrating a 3D stacked device die according to an example of the present invention.

FIG. 15 is a simplified block illustrating a 3D stacked device die according to an example of the present invention. As shown, the stacked device die 1500 includes a plurality of logic devices 1510, each of which includes at least a weight/activation memories module 1520 coupled to a compute engines module 1530 and a controller 1540. In a specific example, the controller 1540 can be configured as a tiny DRAM controller. Each controller 1540 can be configured using a plurality of vias 1542 (e.g., through-silicon vias, or the like) to access a memory bank in the memory die 1550, which is represented by the dotted line region 1550. Although interconnects, hierarchies, and chip interfaces are not shown, this device configuration can be combined with the AI accelerator apparatus and chiplet device configurations discussed previously. For example, the weight/activations memories modules 1520 and compute engines modules 1530 can include the chiplet and slice devices and related components discussed previously. Those of ordinary skill in the art will recognize other variations, modifications, and alternatives to this stacked device configuration.

Figure 16B:
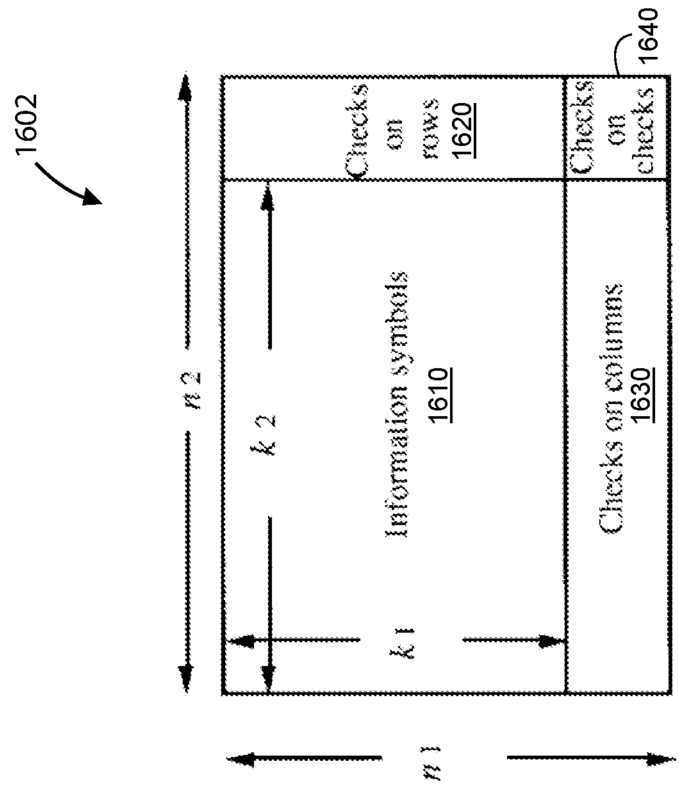
FIGS. 16A and 16B are simplified diagrams illustrating an error correction implementation for a memory device according to an example of the present invention.
Figure 16A:
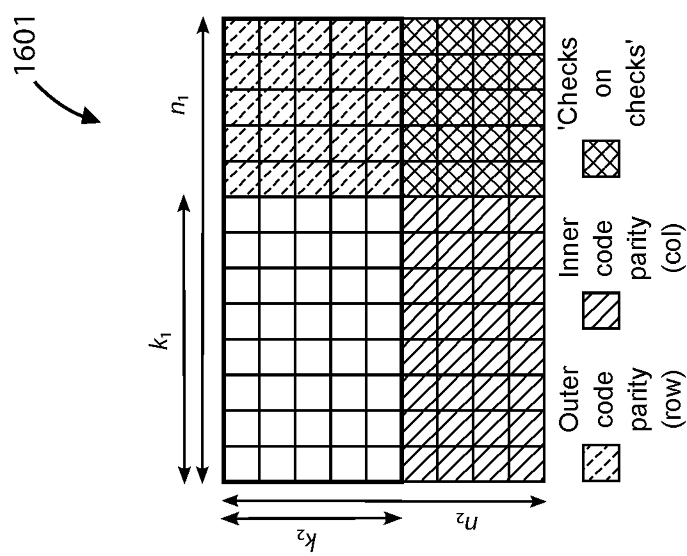

FIGS. 16A and 16B are simplified diagrams illustrating an error correction implementation for a memory device according to an example of the present invention. As shown in FIG. 16A, diagram 1601 shows an example memory layout, which includes information symbols (in the white blocks), outer code parity (row), inner code parity (column), and 'checks on checks'. FIG. 16B shows a similar diagram 1602 with different configuration of dimensions but with the same memory regions for information symbols 1610, checks on rows 1620, checks on columns 1630, and checks on checks 1640. Depending on the embodiment, the memory device can implement this error correction code (ECC) on-chip.

Figure 17A:
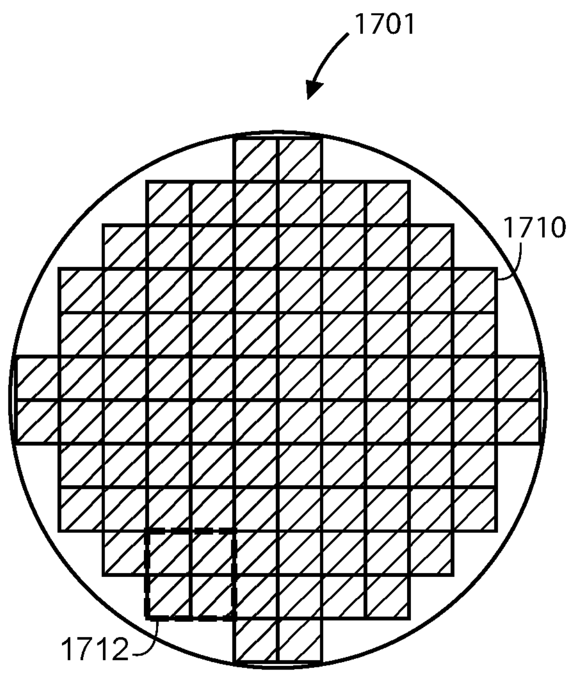
FIGS. 17A-17C are simplified diagrams illustrating a memory tiling configuration for a stacked wafer apparatus according to an example of the present invention.
Figure 17B:
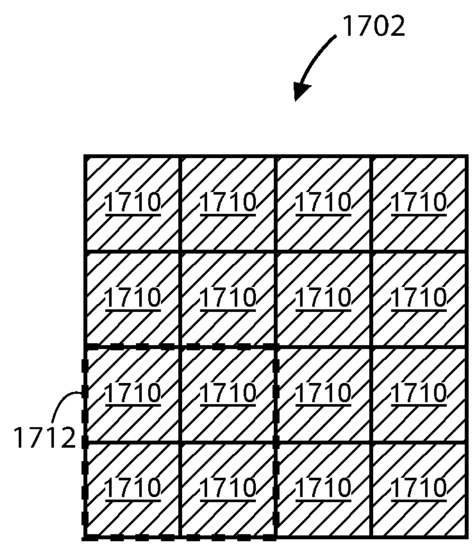
Figure 17C:
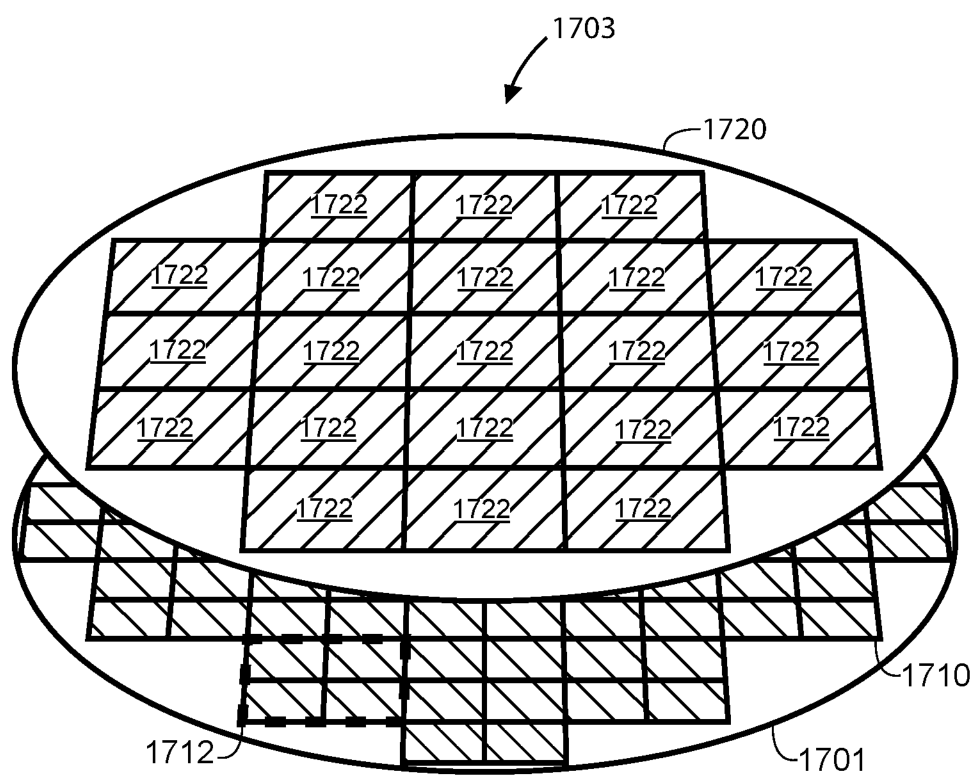

FIGS. 17A-17C are simplified diagrams illustrating a memory tiling configuration for a stacked wafer apparatus according to an example of the present invention. FIG. 17A shows a memory die 1701 having a plurality of memory devices 1710, similar to the memory wafer 1410 shown in FIG. 14A, except here a memory tile 1712 is shown outlined by the dotted line region. Here, the tile is shown in a square 2×2 configuration, but the tile can have different configurations, such as 3×3, 2×4, 4×4, etc. Using such memory tile configurations, the resulting stacked devices can have high memory bandwidth and memory capacity. Further, the scalable memory tile configurations allow for flexible composition of bandwidth and size.

FIG. 17B shows a close up of a portion of the memory devices 1710 with the previous memory tile 1712 outlined by the dotted line region. FIG. 17C shows an exploded view of a stacked wafer apparatus 1703 in which the tile 1712 aligns to one of the logic dies 1722 on a logic wafer 1720 when bonded with the memory wafer 1701. Here, the logic dies 1722 are shown on the topside of the logic wafer 1720 for clarity of the alignment. As discussed previously, the method of bonding can include the memory wafer 1701 rotated face down and bonded overlying the logic wafer 1720, or vice versa.

Figure 18:
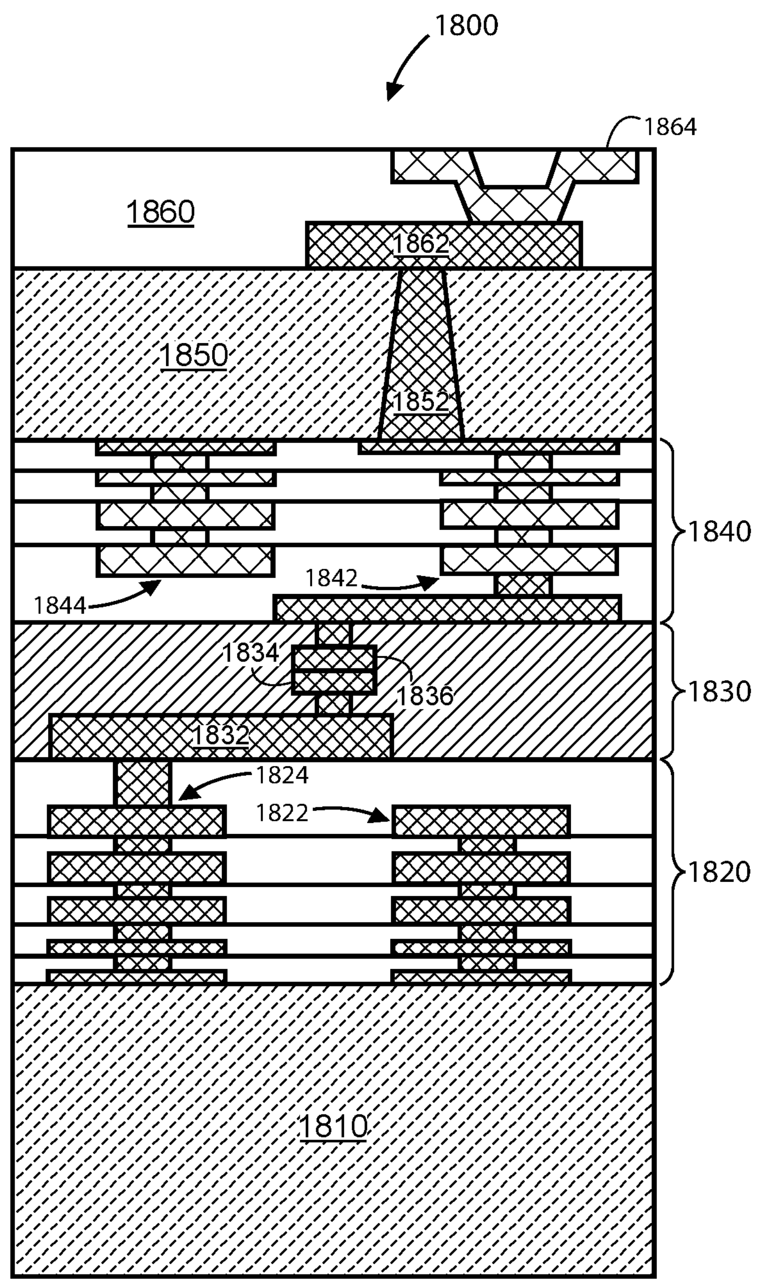
FIG. 18 is a simplified diagram illustrating a cross-sectional view of a stacked logic and memory device according to an example of the present invention.

FIG. 18 is a simplified diagram illustrating a cross-sectional view of a stacked logic and memory device according to an example of the present invention. As shown, the stacked logic and memory device includes a logic device portion and a memory device portion. Here, the logic device portion includes logic Front End of Line (FEOL) layers 1810 and logic Back End of Line (BEOL) layers 1820, while the memory device portion includes memory FEOL 1840 layers and memory BEOL layers 1850. The logic BEOL layers 1820 include metal layers 1822, representing interconnections between components in these layers, and metal layers 1824, representing interconnections from these layers. Similarly, the memory BEOL layers 1820 include metal layers 1842, representing interconnections from these layers, and metal layers 1844, representing interconnections between components in these layers. The logic FEOL and BEOL layers 1810, 1820 can include implementations of the AI accelerator apparatus, chiplet device, and related components discussed previously, and the memory FEOL and BEOL layers 1840, 1850 can include implementations of the memory devices discussed previously.

These two portions can be bonded at the hybrid-bond layers 1830 via bond pads 1834 and 1836. More specifically, the metal layers 1824 of the logic BEOL layers 1820 are coupled to a frontside redistribution layer (FRDL) contact 1832, which is coupled to the bond pad 1834, while the metal layers 1842 are coupled to the bond pad 1836. The metal layers 1842 are also coupled to a through-silicon via (TSV) 1852, which is also coupled to a memory backside redistribution layer (BRDL) contact 1862 within the packaging layer 1860. This BRDL contact 1862 is also coupled to a bond pad 1864 on the topside of the device (i.e., the backside of the memory device). Those of ordinary skill in the art will recognize variations, modifications, and alternatives to these layer configurations.

FIGS. 19A-19C are simplified diagrams illustrating a 3D stacked chiplet and memory device using a hybrid-bonding interconnection according to various examples of the present invention. As shown in FIG. 19A, the stacked device 1901 includes a memory die 1910 with an overlying logic die 1920. The memory die 1910 includes top metal (TM) contacts 1912 and bonding interconnection materials 1914 within dielectric layers 1930, while the logic die 1920 includes TM contacts 1922 and bonding interconnection materials 1924 within dielectric layers 1932. The logic die 1920 is coupled to the memory die 1910 at the bonding interface 1940 such that the bonding interconnection materials 1924 are bonded to the bonding interconnection materials 1924.

The bonding interconnection materials 1914 and 1924 can include metal materials, such as Cu, Al, and the like. In a specific example, the bonding method can include a direct fusion process (e.g., Cu—Cu direct fusion, or the like) with a low bonding temperature (e.g., less than 350 degrees Celsius). In FIG. 19A, an example chemical composition within the dielectric layers 1930 and 1932 is shown as having a silicon oxide based composition, but other dielectric materials may be used as well.

FIG. 19B shows another stacked device 1902 but with a pair of bonding interconnection materials 1914 coupled to one TM contact 1912 and a pair of bonding interconnection materials 1924 coupled to one TM contact 1922, which leads to a multi-point bond at the bonding interface 1940. Device 1902 also includes another bonding interconnection in which the TM metal 1922 is also coupled to a metal layer 1940 which is coupled to a bonding structure 1942 that is exposed via an opening in the logic die 1920.

FIG. 19C shows another stacked device 1903 which has similar TM contacts 1912, 1922 and bonding interconnection materials 1914, 1924, but also includes align marker materials 1916, 1926. The align marker materials 1916 are aligned to the TM contacts 1912 and the align marker materials 1926 are aligned to the TM contacts 1922. In a specific example, the aligned markers can be formed with a high precision (e.g., 0.25 um). The stacked device can also have small pitch size (e.g., 3 um) and up to 110,000/mm$^2$ integration density. Depending on the embodiment, such stacked devices can include implementations of the AI accelerator apparatus, chiplet device, memory devices, and related components discussed previously.

FIG. 19D is a device level image showing a cross-sectional view of a 3D stacked chiplet and memory device according to an example of the present invention. As shown, device image 1904 shows a logic TM contact coupled to a DRAM TM contact via bonding interconnection materials coupled at the bonding interface 1940. Those of ordinary skill in the art will recognize variations, modifications, and alternatives to these bonding techniques.

Figure 20:
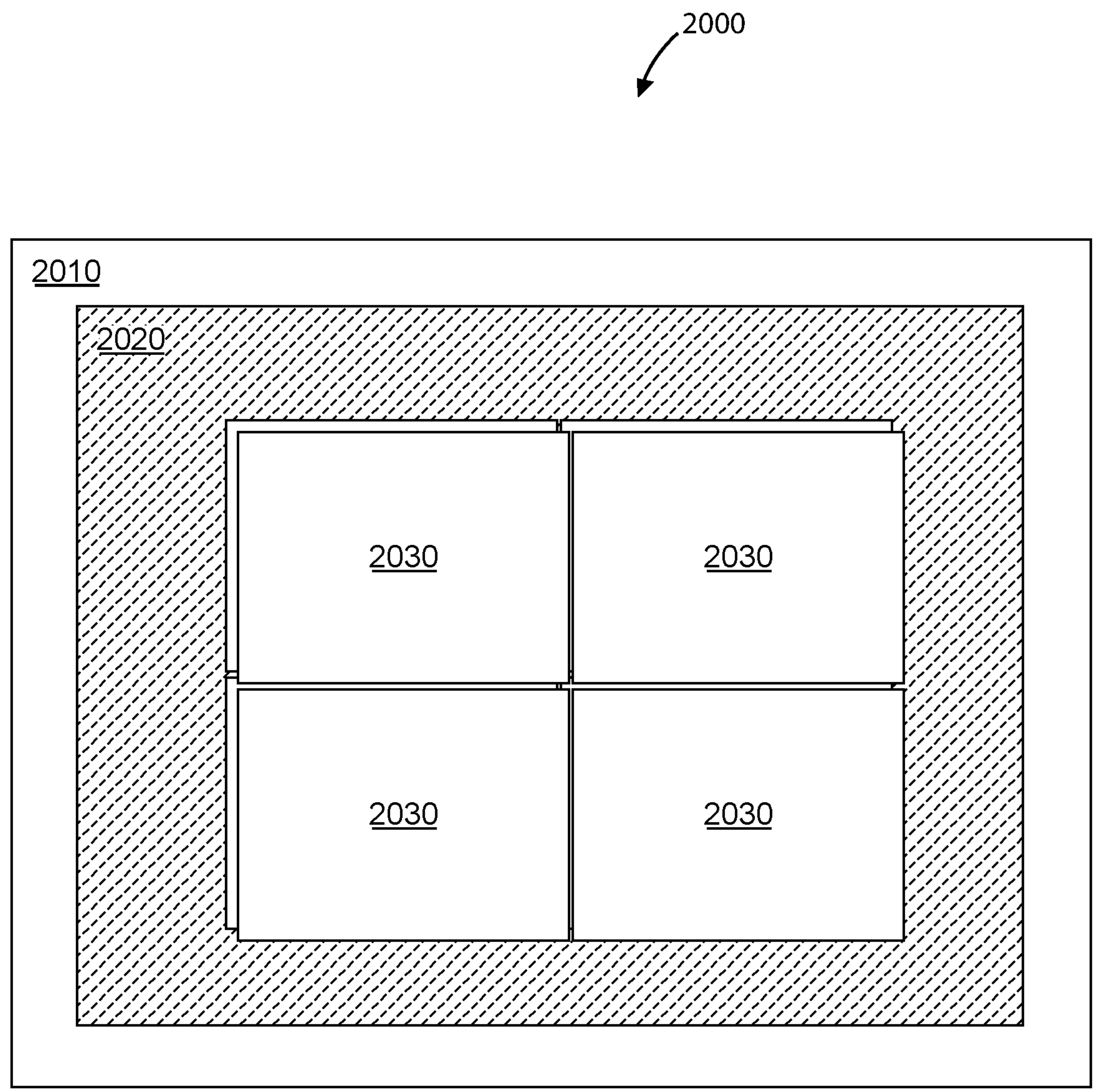
FIG. 20 is a simplified diagram illustrating a top view of a 3D stacked AI accelerator apparatus according to an example of the present invention.

FIG. 20 is a simplified diagram illustrating a top view of a 3D stacked AI accelerator apparatus according to an example of the present invention. As shown, the apparatus 2000 includes a plurality of 3D stacked chiplet devices 2030 formed overlying a wafer substrate 2010 with a die region 2020. As discussed previously, the stacked chiplet devices 2030 can be formed using a wafer-on-wafer hybrid bonding process, or the like. Here, there are four stacked chiplet devices 2030 arranged in a 2×2 configuration overlying the die region 2020, but there can be other configurations (e.g., 1×2, 3×3, 2×4, etc.). Further details of these chiplet devices 2030 are shown in FIGS. 21A-21F.

Figure 21A:
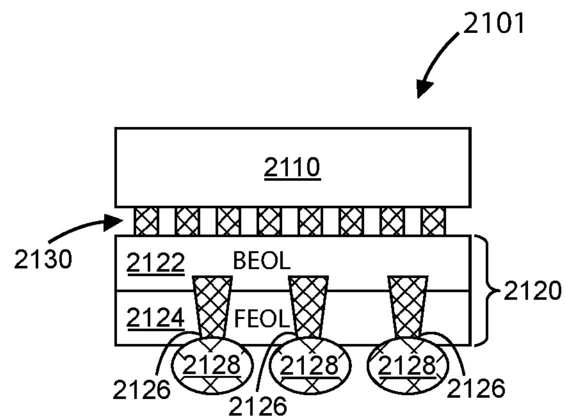
FIGS. 21A-21F are simplified diagrams illustrating cross-sectional views of 3D stacked chiplet devices according to various examples of the present invention.

FIG. 21A is a simplified diagram illustrating a cross-sectional view of an example 3D stacked chiplet device 2101 with a logic die 2110 overlying a memory die 2120. These dies are bonded by a plurality of contacts 2130, which can include the materials and processes discussed previously. In a specific example, the memory die 2120 can be formed as a thin layer (e.g., 10 um memory die vs. 775 um logic die for 21 nm technology) that extends as if part of the logic die 2110. Also, the plurality of contacts 2130 can be characterized by 3 u pitch and the bump contacts 2128 can be characterized by a 110 um-130 um pitch. Here, the memory die 2120 shows BEOL layers 2122 and FEOL layers 2124 with TSVs 2126 configured between these layers and coupled to bump contacts 2128.

Figure 21B:
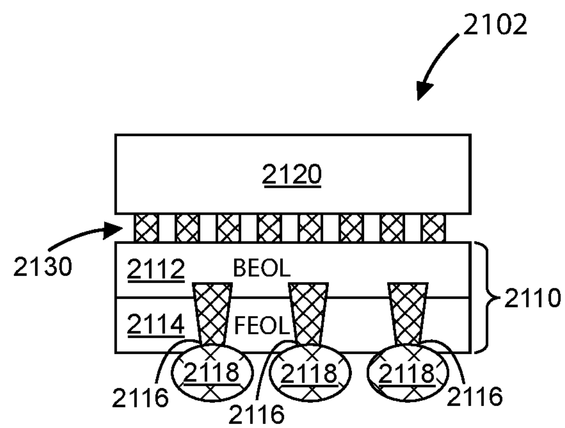

FIG. 21B is a simplified diagram illustrating a cross-sectional view of an example 3D stacked chiplet device 2102 with the memory die 2120 overlying the logic die 2110. These dies are also bonded by the plurality of contacts 2130. Here, the logic die 2110 shows BEOL layers 2112 and FEOL layers 2114 with TSVs 2116 configured between these layers and coupled to bump contacts 2118.

Figure 21C:
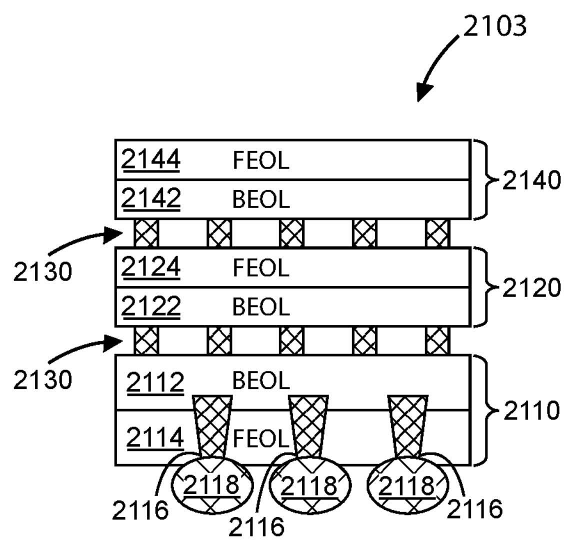

FIG. 21C is a simplified diagram illustrating a cross-sectional view of an example 3D stacked chiplet device 2103 with stacked memory dies 2020, 2040 overlying the logic die 2110. Similar to device 2102, these dies are bonded by the plurality of contacts 2130. Here, the second memory die 2140 includes BEOL layers 2142 and FEOL layers 2144, and is bonded to the first memory die 2120 using a face-to-back hybrid bonding process. This face-to-back bond results in the FEOL layers 2124 of the first memory die 2120 being bonded to the BEOL layers 2142 of the second memory die 2140. Depending on the embodiment, additional memory dies can be stacked in the same manner for higher capacity. Further, the logic die 2010 can be configured overlying the stacked memory dies (similar to device 2101) as well.

Figure 21D:
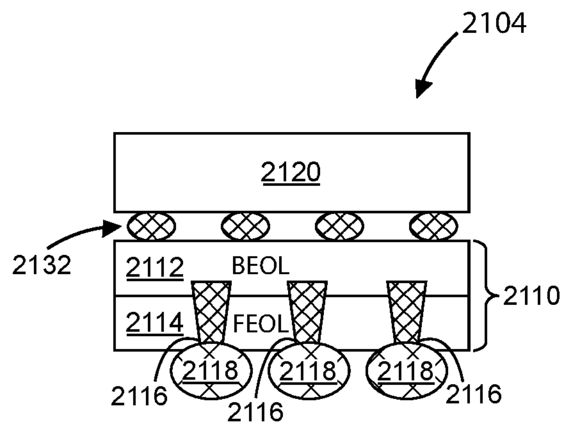
Figure 21E:
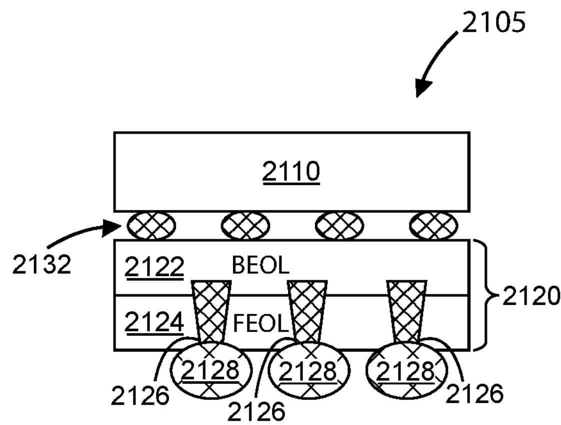

FIGS. 21D and 21E are simplified diagrams illustrating cross-sectional views of example 3D stacked chiplet devices 2104 and 2105 using micro bumps 2132. As shown, devices 2104 and 2105 are similar to devices 2102 (memory die on logic die) and 2101 (logic die on memory die), respectively, but the logic die 2110 and the memory die 2120 are bonded using micro bumps 2132. In a specific example, the micro bumps 2132 can be characterized by a 10 u-36 um pitch. These micro bumps 2132 can also be used to form stacked memory dies, similar to device 2103.

Figure 21F:
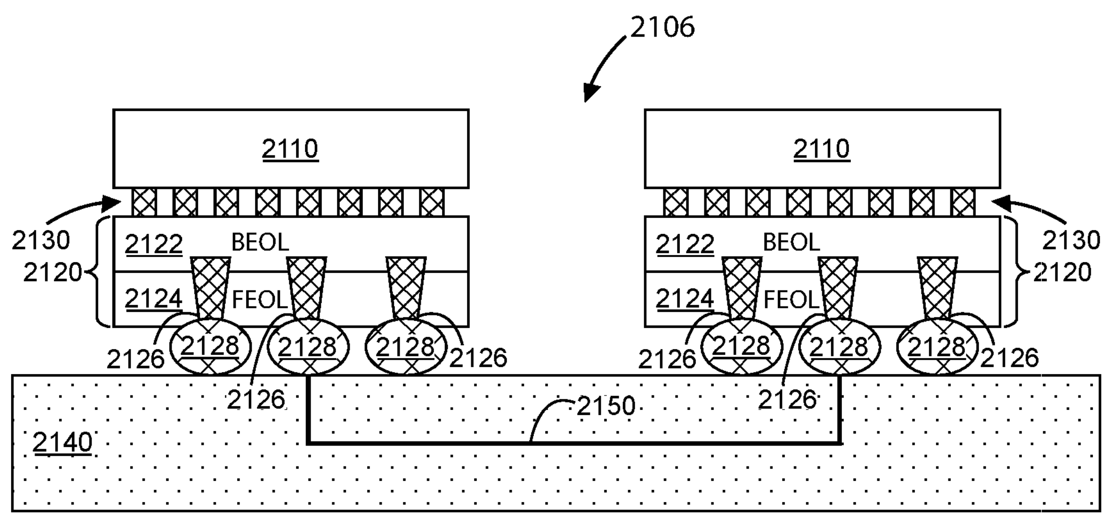

FIG. 21F is a simplified diagram illustrating a cross-sectional view of an example 3D stacked die-to-die (D2D) link system. As shown, system 2106 includes two 3D stacked chiplet devices similar to device 2101 overlying a substrate member 2140 (e.g., organic substrate, or the like). These two stacked chiplet devices are coupled together by a D2D interconnect 2150 coupled between the bumps 2128 of each stacked chiplet device. In an example, the interconnect 2150 can include Universal Chiplet Interconnect Express (UCIe), or the like. Those of ordinary skill in the art will recognize variations, modifications, and alternatives to these stacked configurations.

Figure 22:
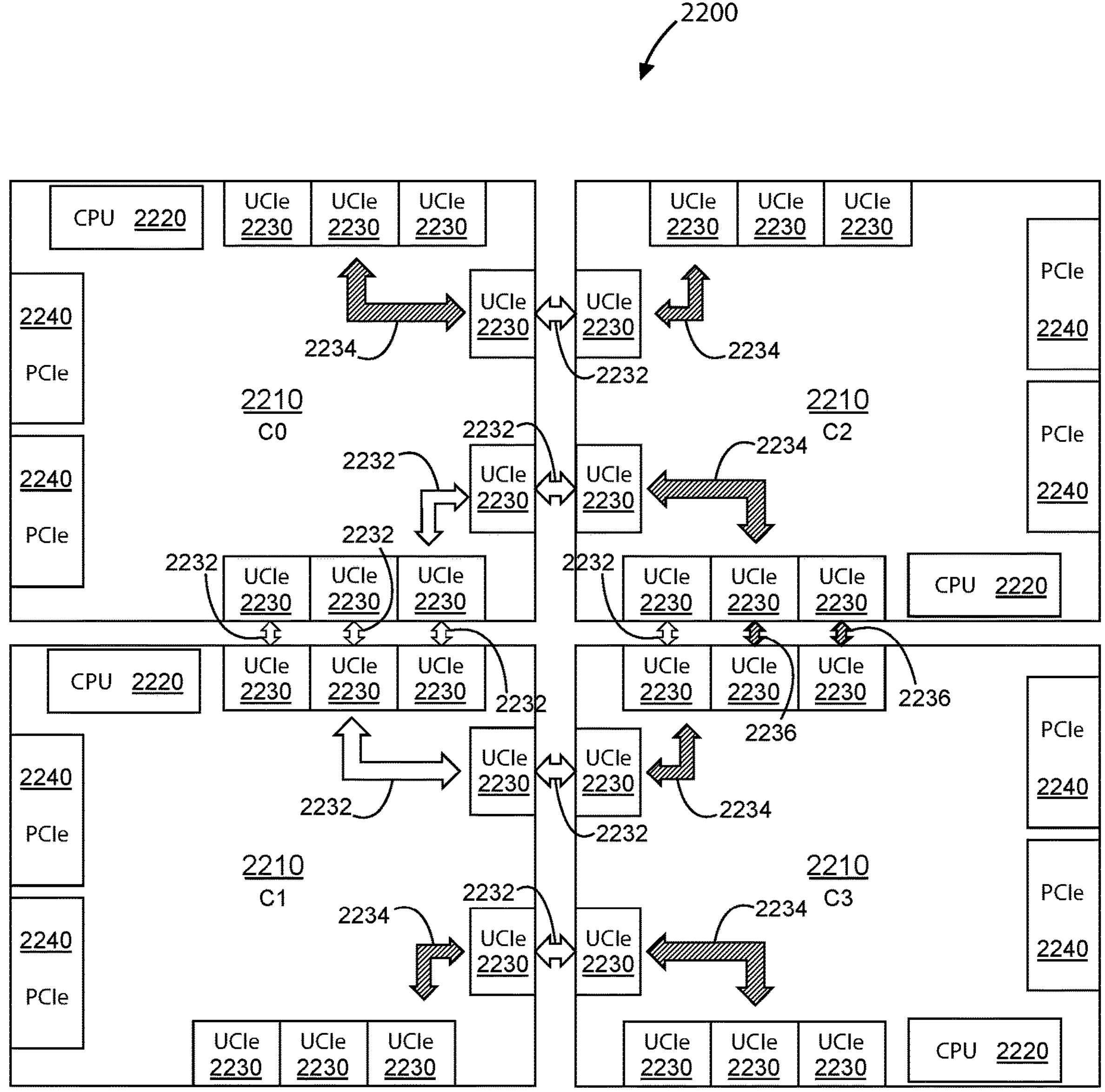
FIG. 22 is a simplified diagram illustrating a top view of an example AI accelerator apparatus using full mesh chiplet connectivity according to an example of the present invention.

FIG. 22 is a simplified diagram illustrating a top view of an example AI accelerator apparatus using full mesh chiplet connectivity according to an example of the present invention. As shown, the apparatus 2200 includes a plurality of chiplet devices 2210, which can include 3D stacked chiplet device configurations discussed previously. Each chiplet device 2210 includes at least a CPU 2220, a plurality of D2D interconnects 2230, and a plurality of device interconnects 2240 (e.g., PCIe interconnects, or the like). Each chiplet device 2210 also includes a plurality of non-diagonal links both within the chiplet device 2210 and between chiplet devices 2210. Here, apparatus 2200 shows links between the D2D interconnects 2230 within (intra-chiplet non-diagonal links) and between (inter-chiplet non-diagonal links) the chiplet devices 2210, and these links can be configured as active links 2232, disabled links 2234, or unused links 2236. The active links 2232 provide connections between chiplet devices 2210 and to different portions of a chiplet device 2210, while the disabled links 2234 can limit undesired connections that were provided by default. And, the unused links 2236 can be used for future connections to other components or devices (e.g., co-package optical link). In this configuration, the apparatus 2200 can have full mesh chiplet connectivity without diagonal links on the package. Of course, there can be other variations, modifications, and alternatives.

These techniques can be implemented with any of the other AI accelerator apparatus configurations discussed herein. For example, the apparatus can include a plurality of chiplets coupled together in the full mesh connectivity configuration. Each of these chiplets can include a plurality of tiles, and each of these tiles can include at least a plurality of slices, a CPU coupled to the plurality of slices, and a hardware dispatch device coupled to the CPU. The apparatus includes a plurality of D2D interconnects coupled to each of the CPUs in each of the tiles, and at least one of the D2D interconnects of each chiplet is coupled to one of the D2D interconnects of each other chiplet using a non-diagonal link. In a specific example, the plurality of chiplets includes at least four chiplets, and the each of the chiplets is coupled to each other chiplet in the full mesh connectivity configuration using a plurality of intra-chiplet non-diagonal links and a plurality of inter-chiplet non-diagonal links.

The apparatus can also include a first clock configured to output a clock signal of about 0.5 GHz to 4 GHz, and each of the slices can include a digital in memory compute (DIMC) device coupled to a second clock configured at an output rate of one half of the rate of the first clock. As discussed previously, this DIMC device can be configured to allow for a throughput of one or more matrix computations provided in the DIMC device such that the throughput is characterized by 512 multiply accumulates per a clock cycle. The chiplets can also include interconnect interfaces (e.g., PCIe interfaces, or the like), memory interfaces (e.g., DRAM interfaces, or the like), global CPU interfaces (e.g., RISC interfaces, or the like), as well as other interfaces to facilitate communication between the chiplets, memory and a server or host system.

According to an example, the present invention provides for methods and devices for processing transformer workloads involving prompt processing. The prompt processing can include AI-driven processing tools (e.g., ChatGPT, or the like) that generate tokens in response to a given prompt, and then generate tokens in response to a follow-up prompt with context. Such prompt processing can include matrix processing using a language model, such as the BERT Large model 800 shown in FIG. 8, with attention head devices, such as the attention head device 900 shown in FIG. 9.

For example, consider an initial prompt of "who manufactures the chips used in the Apple iPhone?", which generates output tokens including a list of suppliers and the statement "however, in recent years, TSMC has become the primary supplier of the chips in the Apple iPhone." A follow-up prompt can include "why has TSMC become the primary supplier?", which would trigger token generation to the follow-up prompt with context. An example processing of the follow-up prompt is shown in the following figure.

Figure 23:
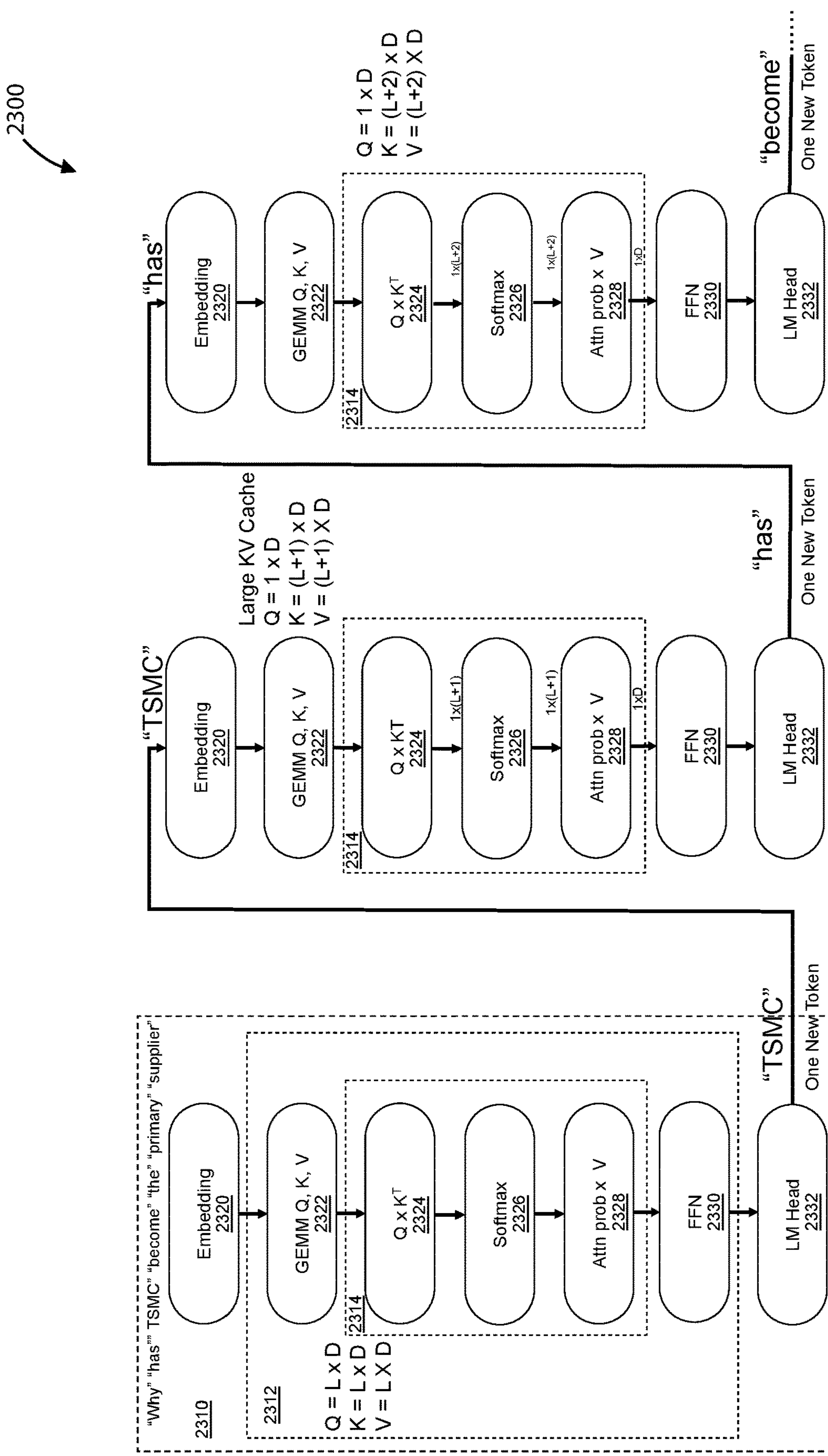
FIG. 23 is a simplified flow diagram illustrating a method of operating a transformer model according to an example of the present invention.

FIG. 23 is a simplified flow diagram illustrating a method of operating a transformer model according to an example of the present invention. The transformer model 2300 is represented by a plurality of layers 2310 configured to cyclically process input tokens using an attention mechanism. Each layer of this model includes at least the following steps/layers: an embedding layer 2320, a Query, Key, Value (QKV) projection layer 2322; first matrix computation layer 2324, a softmax layer 2326, a second matrix computation layer 2328, a feed-forward network (FFN) layer 2330, and a language model (LM) head layer 2332. In an example, the layers marked by dotted line region 2312 include the self-attention steps discussed previously.

In the embedding layer 2320, the input prompt processed as input vectors (i.e., embeddings) of each unit of the prompt. Referring to the previous example, this transformer model 2300 is shown to process the follow-up prompt "why has TSMC become the primary supplier". As shown, each cycle through the plurality of layers 2310 is processing one word of the prompt, and the embedding layer 2320 is generating an embedding vector of each such word.

In the QKV projection layer 2322, three vectors (query, key, and value vectors) are created for each input token (e.g., embedding vector). These vectors are determined by multiplying the input token by three weight matrices trained during the training process. In a specific example, this layer 2322 implements a general matrix multiply (GeMM) algorithm to process the prompt. Also, token generation can include a general matrix vector (GeMV) algorithm. These processes can face challenges of being compute bound and/or memory bound.

In the first matrix computation layer 2324, a score is determined between a target token and each token in the sequence. This score is calculated by the dot product of the target token's query (Q) vector and the each token's key (K) vector (in a transposed format). In a specific example, the scores are also divided by the square root on the dimension ($d_k$) of the key vectors. In the softmax layer 2326, a softmax operation is performed to normalize the scaled scores. Then, in the second matrix computation layer 2328, each value vector is multiplied by the softmax score to determine weighted value vectors, and the weighted value vectors are added to produce the output for the target token.

These layers, which are marked by the dotted line region 2314, can include a caching process (e.g., large KV cache, or the like) to facilitate the computations discussed previously. As shown, FIG. 23 shows example growth of QKV data stored in main memory/cache memory with each subsequent token processing cycle. In an example, these operations are condensed using matrix operations. The input tokens can be configured in a matrix and multiplied with the three weight matrices to produce query, key, and value matrices. The scores are determined by the dot product of the query and transposed key matrices, and the softmax of those scores after scaling is multiplied with the value matrix to determine an output matrix.

The outputs of the self-attention layers are sent to the FFN layer 2330, which then outputs to the LM head layer 2332. This LM head layer 2332 can predict the next token in a sequence based on the previous tokens, which is fed to the next layer. Here, the first layer 2310 processes the "TSMC" token, the subsequent layer processes the "has" token with context, and the layer after that processes the "become" token. This cycle can process subsequent tokens with context from the previously processed token, and this cycle can continue until all tokens from the prompt are processed. Of course, those of ordinary skill in the art will recognize other variations, modifications, and alternatives.

Figure 24:
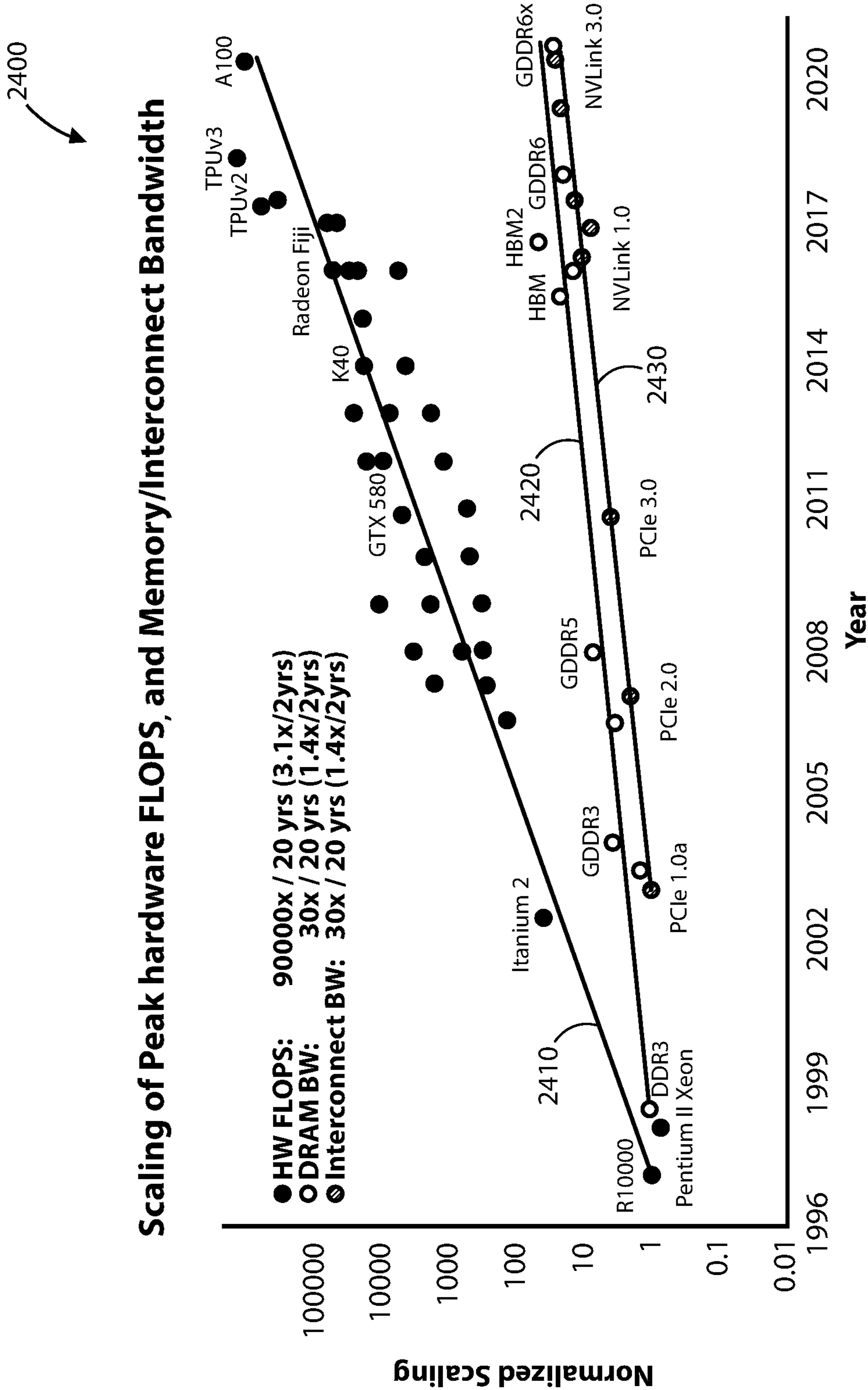
FIG. 24 is a simplified graph illustrating the effect of memory bandwidth and interconnect bandwidth on performance of processing transformer workloads.

FIG. 24 is a simplified graph illustrating the effect of memory bandwidth and interconnect bandwidth on performance of processing transformer workloads. As shown, graph 2400 shows normalized scaling of hardware (HW) flops, memory bandwidth (BW), and interconnect BW over time (years). The HW flops scaling is shown to have increased about 90,000 times over 20 years (about 3.1 times over 2 years), while the memory (DRAM) BW and interconnect BW scaling is shown to have increased about 30 times over 20 years (about 1.4 times over 2 years. Further, various data points show specific reference devices for context.

Figure 25:
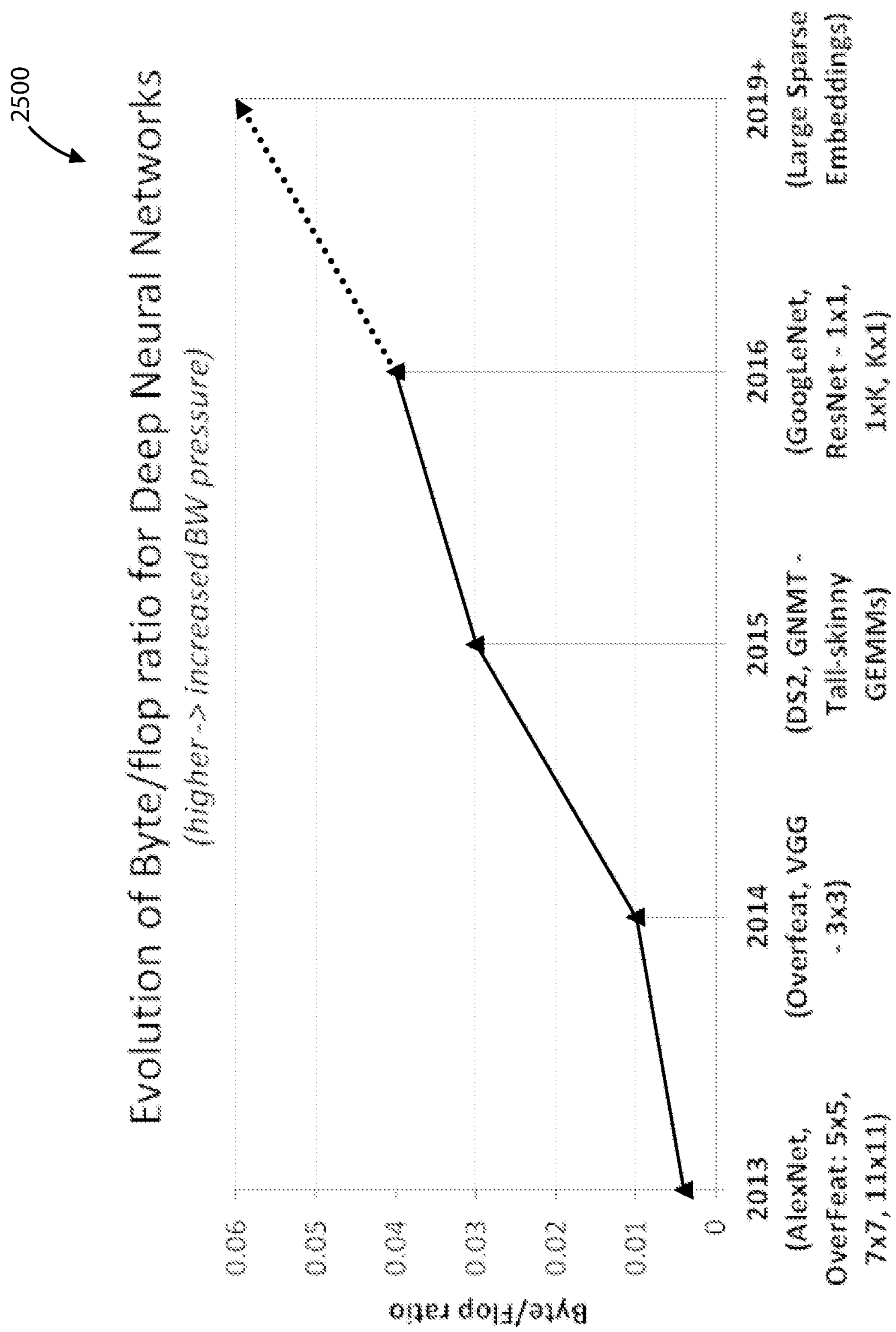
FIG. 25 is a simplified graph illustrating the evolution of byte/flop (B/F) ratio for deep neural networks.

FIG. 25 is a simplified graph illustrating the evolution of byte/flop (B/F) ratio for deep neural networks. As shown, graph 2500 shows byte/flop ratio over time (years), with the ratio growing steadily through 2019. Further, each data point includes example neural networks for the specific year in which the byte/flop ratio is measured. At 0.06 B/F, a memory bandwidth of 25 TB/s is needed. However, AI compute applications in 2020 involve about 400 tera operations per second (TOPS). For example, GPT has a 0.125 B/F ratio, which requires about 200 TB/s. Such data shows the insatiable memory bandwidth required by AI compute applications using deep neural networks.

Figure 26:
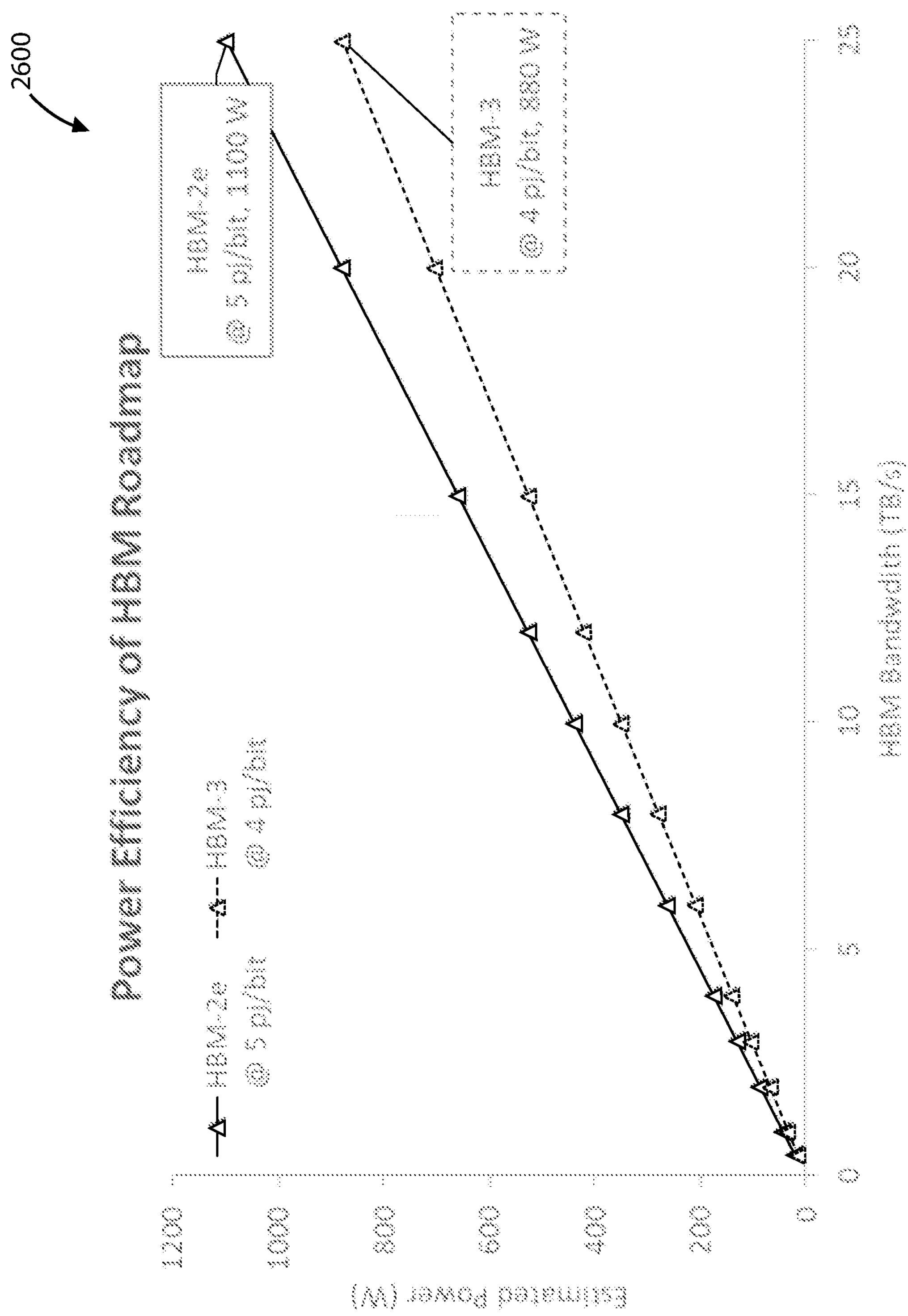
FIG. 26 is a simplified graph illustrating the power efficiency of high bandwidth memory (HBM).

FIG. 26 is a simplified graph illustrating the power efficiency of high bandwidth memory (HBM). As shown, graph 2600 shows estimated power (W) over bandwidth (TB/s) for two versions of HBM: HBM-2e and HBM-3. This data shows the energy efficiency gap is getting bigger. In an example, desirable target power efficiency for AI compute can include a memory bandwidth of 25 TB/s with power at 100 W. Referring to the previous GPT example, HBM at 200 TB/s would require about 6 KW, which is too much power consumed.

As discussed previously, the present methods and configurations for 3D stacked devices offer significant performance advantages. Depending on the embodiment, the benefits can include around 10 to 20 times improvement in bandwidth and power over conventional embodiments, such as HBM and the like. Stacked DRAM configurations can have around six times the capacity compared to SRAM or similar configurations. And, the capacity of such stacked configurations can be expanded through multi-layer memory device stacking. Further, the methods for fabricating these stacked configurations can have lower cost due to factors such as not requiring a silicon interposer and using proven low-cost hybrid bonding processes that are foundry compatible.

Figure 27A:
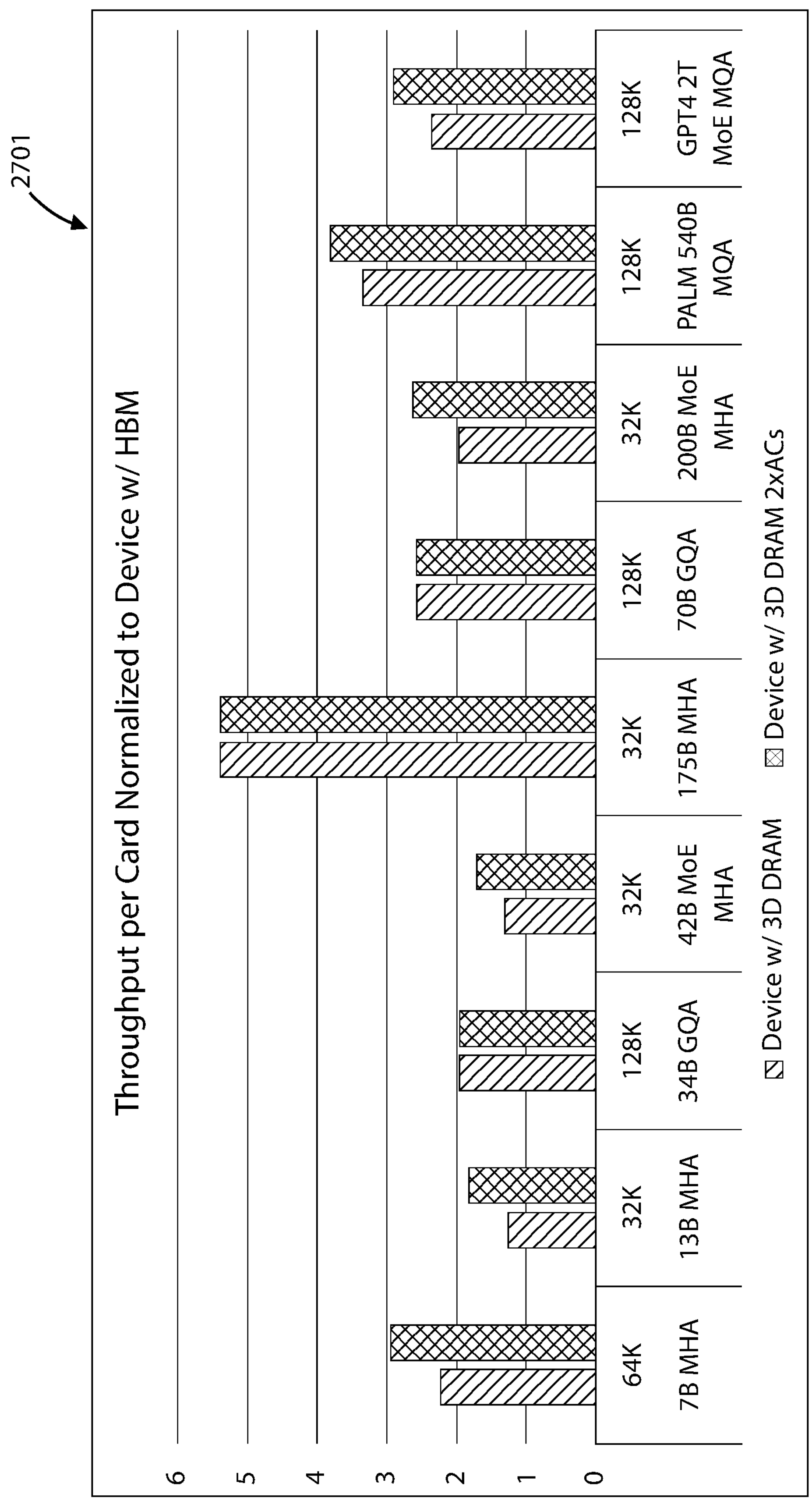
FIG. 27A is a simplified graph showing throughput data for 3D stacked AI accelerator apparatuses according to various examples of the present invention.

FIG. 27A is a simplified graph showing throughput data for 3D stacked AI accelerator apparatuses according to various examples of the present invention. More specifically, graph 2701 shows the throughput per card for two 3D stacked apparatus configurations, "3D DRAM" and "3D DRAM 2×ACs", as applied to a variety of transformer models. These apparatus configurations can be configured in various card form factors, such as the PCIe card examples shown in FIGS. 1A and 1B. Also, these throughput measurements are normalized to a device configuration using HBM. In this case, the data shows about a two to five times improved throughput per card for both stacked configurations compared to an HBM configuration at extremely large context lengths.

Figure 27B:
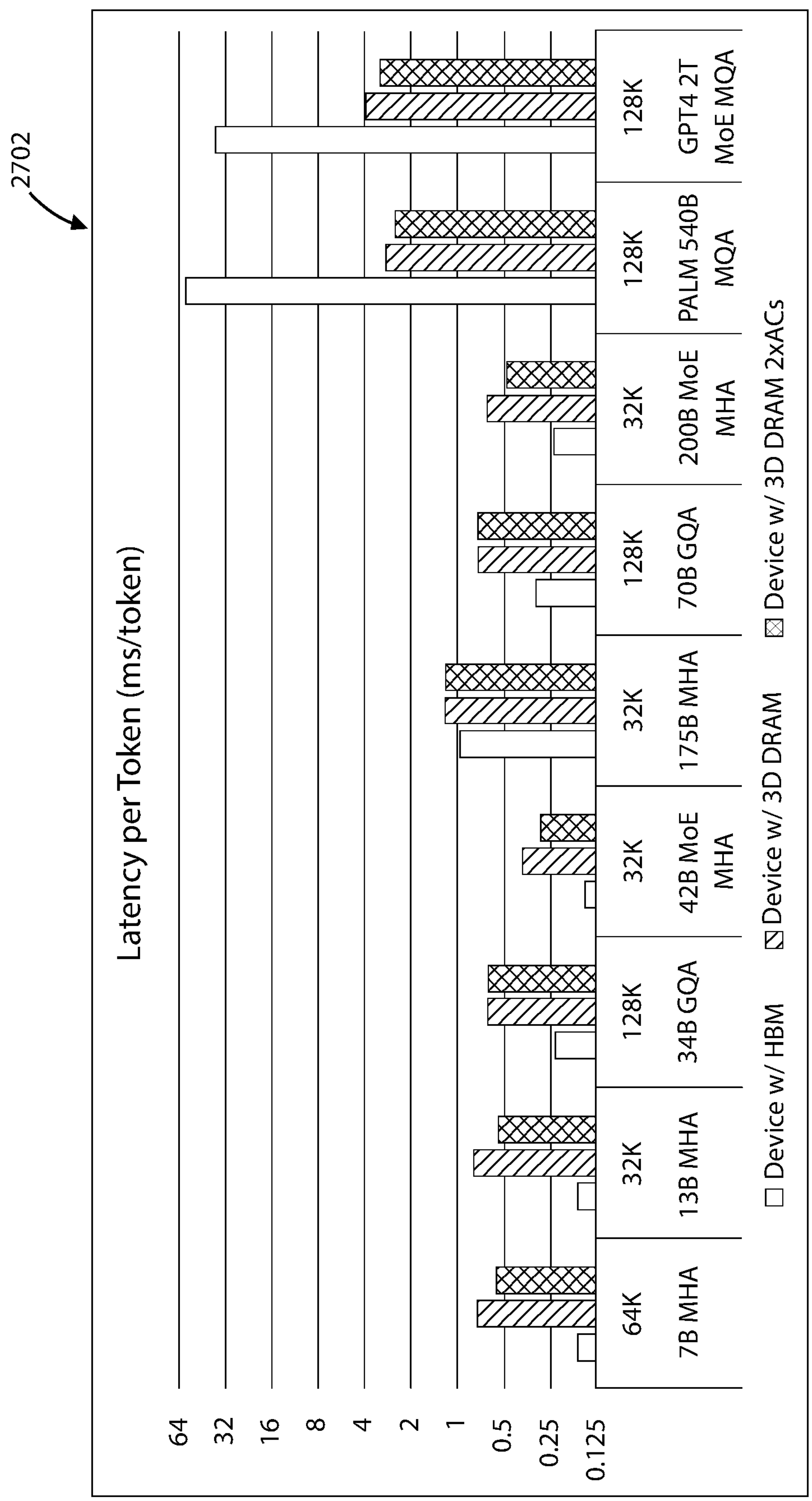
FIG. 27B is a simplified graph showing latency data for 3D stacked AI accelerator apparatuses according to various examples of the present invention.

FIG. 27B is a simplified graph showing latency data for 3D stacked AI accelerator apparatuses according to various examples of the present invention. More specifically, graph 2702 shows latency per token for two 3D stacked apparatus configurations, "3D DRAM" and "3D DRAM 2×ACs", and an HBM device configuration, as applied to a variety of transformer models. In this case, the data shows that the stacked configurations have about a three to four times competitive advantage for large models, such as PALM and GPT4.

Figure 27C:
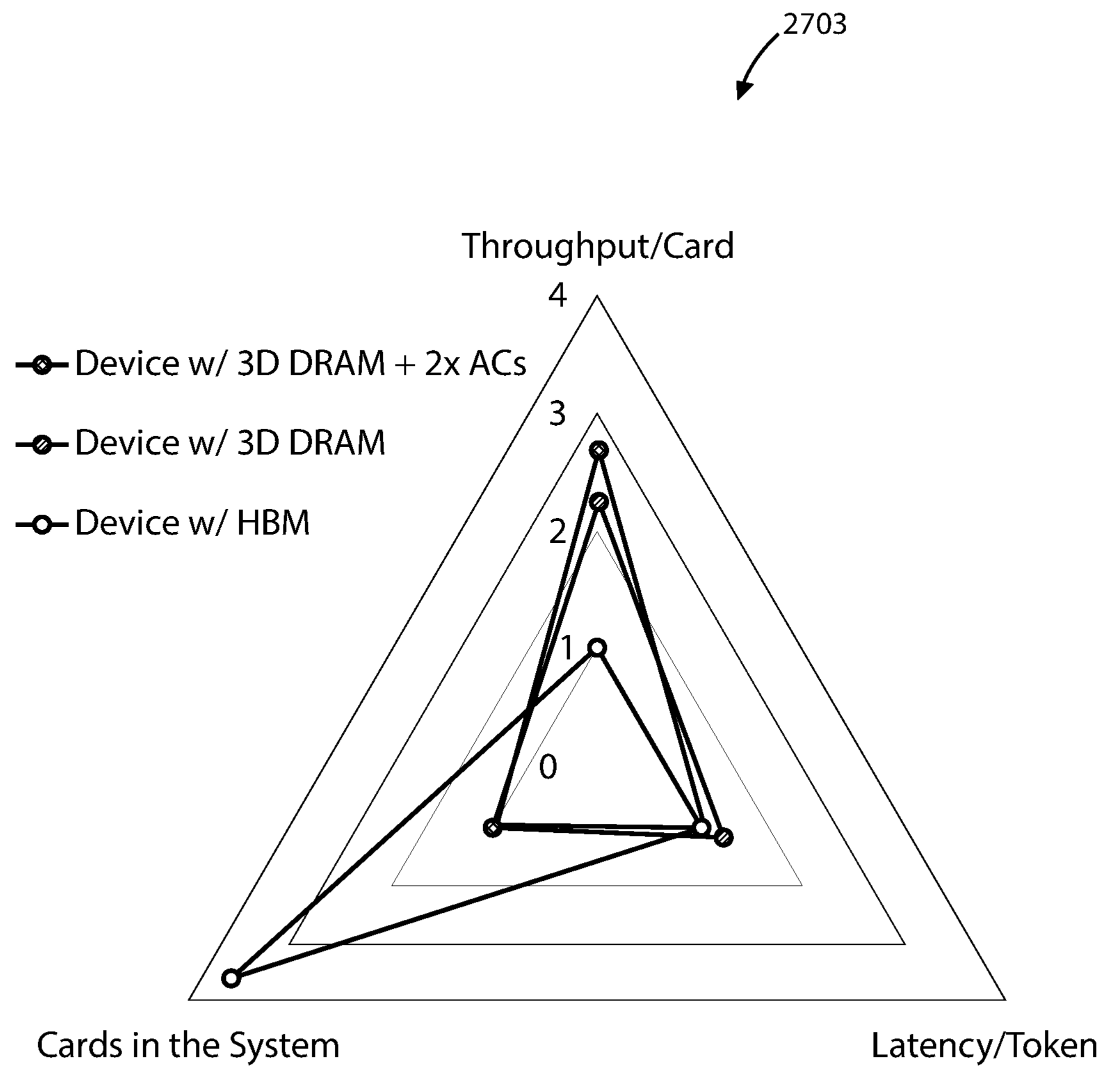
FIG. 27C is a simplified graph showing a comparison of throughput per card, latency per token, and number of cards in the system for an HBM device configuration and two 3D stacked apparatus configurations according to examples of the present invention.

FIG. 27C is a simplified graph showing a comparison of throughput per card, latency per token, and number of cards in the system for an HBM device configuration and two 3D stacked apparatus configurations according to examples of the present invention. The two stacked configurations include "3D DRAM" and "3D DRAM 2×ACs", the same configurations shown previously in FIGS. 27A and 27B. Here, graph 2703 shows that the stacked configurations not only demonstrate the improved throughput discussed previously, but also these stacked configurations also enable around a three times reduction in number of cards in the serving system.

Figure 28A:
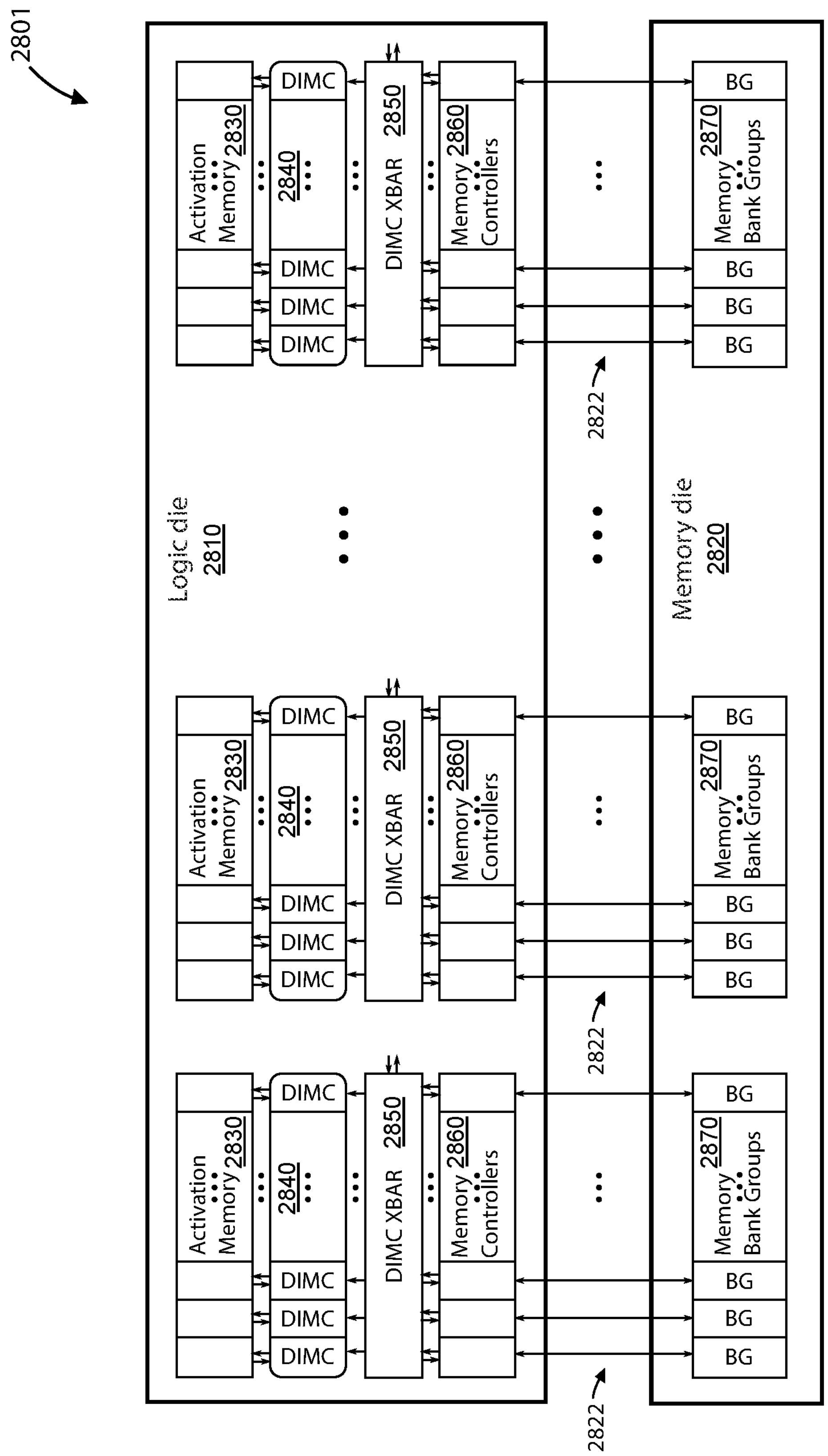
FIG. 28A is a simplified block diagram illustrating a 3D stacked AI accelerator apparatus with a memory die having memory bank group devices according to an example of the present invention.

FIG. 28A is a simplified block diagram illustrating a 3D stacked AI accelerator apparatus with a memory die having memory bank group devices according to an example of the present invention. As shown, apparatus 2801 includes a logic die 2810 coupled to a memory die 2820 and having a plurality of compute paths that extend across both dies. In the logic die 2810, the compute path includes an activation memory device 2830 coupled to compute device 2840 that is coupled to a crossbar device 2850, which is also coupled to plurality of memory controls 2860. The activation memory device 2830 includes a plurality of activation memory units that are each coupled to one of a plurality of compute units in the compute device 2840 (shown by arrows). Here, the activations are stored on the logic die 2810 (e.g., AI accelerator apparatus or chiplet device), while the weights and KV cache (i.e., cache memory devices configured for the Key and Value computations discussed previously) are offloaded to the memory die 2820. Each of these compute units and each of the memory controllers 2860 is also coupled to the crossbar device 2850 (also shown by arrows). The logic die 2810 can incorporate any of the previously discussed components and techniques discussed previously for AI accelerator apparatuses and chiplet devices.

In the memory die 2820, the compute path includes a plurality of memory bank group devices 2870, each of which is also coupled to the memory controllers 2860 via interconnections 2822. Further details of these bank group devices 2870 are discussed with reference to FIG. 28C. In an example, the interconnections 2822 can include bump connections (e.g., microbumps, or the like) or a hybrid bond connection. The interconnections 2822 can include any of the stacked bonding configurations discussed previously. This 3D stacked configuration can be optimized for large read transfers to facilitate the processing of transformer workloads.

Figure 28B:
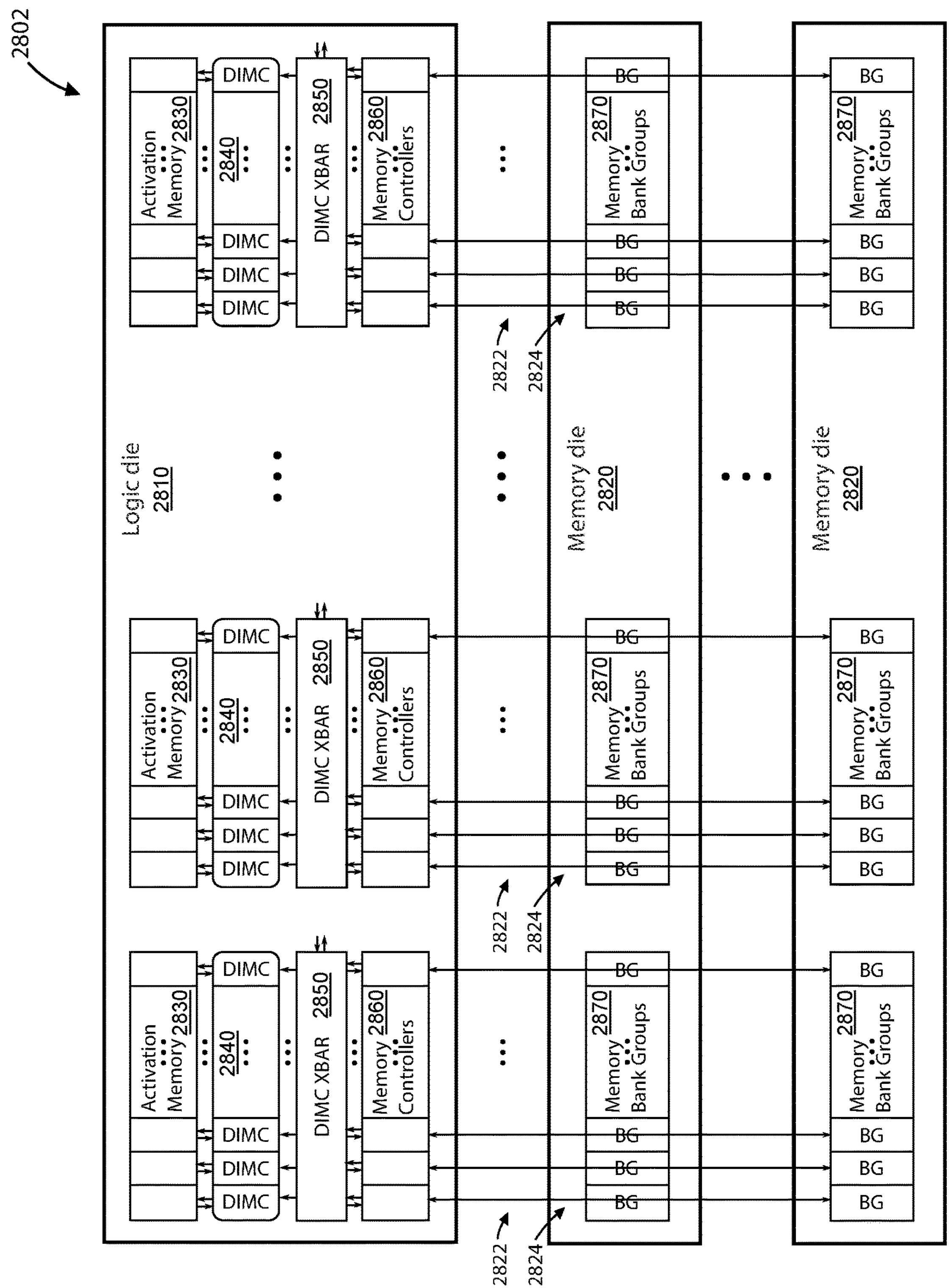
FIG. 28B is a simplified block diagram illustrating a 3D stacked AI accelerator apparatus with multiple stacked memory dies having memory bank group devices according to an example of the present invention.

FIG. 28B is a simplified block diagram illustrating a 3D stacked AI accelerator apparatus with multiple stacked memory dies having memory bank group devices according to an example of the present invention. As shown, apparatus 2802 extends the 3D stacking configuration of apparatus 2801 with one or more additional memory dies 2820. In an example, the connections from the plurality of memory controls 2860 through any of the memory dies 2820 can include via structures 2824 that couple the plurality of memory bank group devices 2870 of one memory die 2820 to those of an adjacent memory die 2820.

Figure 28C:
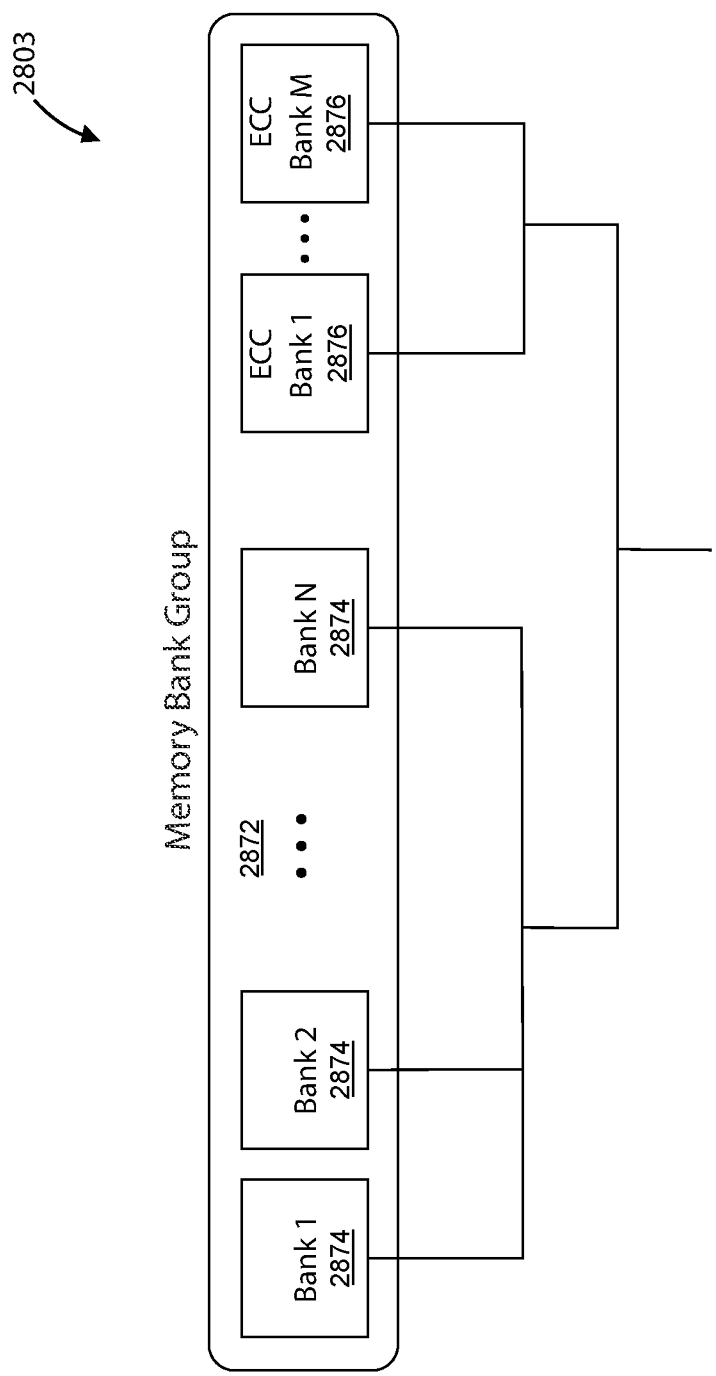
FIG. 28C is a simplified block diagram illustrating a memory bank group device configuration according to an example of the present invention

FIG. 28C is a simplified block diagram illustrating a memory bank group device configuration according to an example of the present invention. As shown, the device configuration 2803 includes a memory bank group device 2872 with a plurality of memory bank units 2874 (shown numbered 1 to N) and a plurality of error correction code (ECC) bank units 2876 (shown numbered 1 to M). While the memory bank units 2874 store the data for processing transformer workloads, the ECC bank units provide error correction capability to tolerate memory bank failures and can protect against microbump (ubump) manufacturing failures. For example, the bank group device 2872 configured for 64-bit bank units can have eight bank units 2874 and two ECC bank units 2876, which can tolerate up to two bank failures. This capability can also include determining which bit locations have failed. Those of ordinary skill in the art will recognize other variations, modifications, and alternatives to the memory bank group device and 3D stacked AI accelerator apparatus configurations.

Figure 29A:
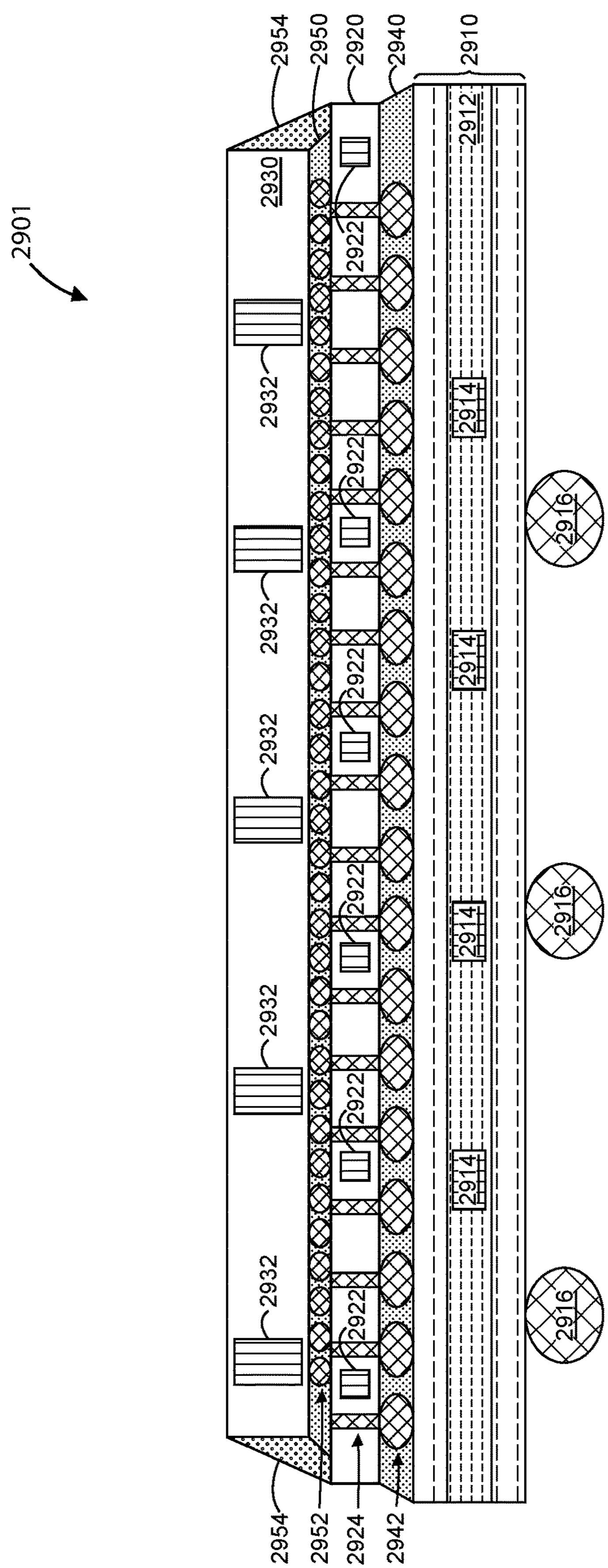
FIG. 29A is a simplified diagram illustrating a cross-sectional view of a 3D stacked AI accelerator apparatus with an organic substrate according to an example of the present invention.

FIG. 29A is a simplified diagram illustrating a cross-sectional view of a 3D stacked AI accelerator apparatus with an organic substrate according to an example of the present invention. As shown, the apparatus 2901 includes an organic substrate 2910 with an overlying memory die 2920 and an overlying logic die 2930 in a stacked configuration. Here, the logic die 2930 is configured overlying the memory die 2920, but the memory die 2920 can be configured overlying the logic die 2930 as well (see FIGS. 21A-21F).

The organic substrate 2910 includes a substrate core layer 2912 having a plurality of passive embedded decoupling capacitors 2914. The organic substrate 2910 can also include a plurality of underlying packaging interconnections 2916, which can include ball grid array (BGA) balls, or the like. The memory die 2920 includes a plurality of active embedded decoupling capacitors 2922 and a plurality of via structures 2924 (e.g., through-silicon vias, or the like). The memory die 2920 can also include any of the memory die components and configurations discussed previously. The logic die 2930 also includes a plurality of active embedded decoupling capacitors. Similarly, the logic die 2930 can also include any of the logic die components and configurations discussed previously. In a specific example, the logic die can have a thickness of about 750-800 μm and the memory die can have a thickness of about 45-55 um, but these thicknesses can vary depending on the application.

FIG. 29A also shows an example interconnection configuration between the organic substrate 2910, the memory die 2920, and the logic die 2930. Here, the memory die 2920 is coupled to the organic substrate 2910 via an underfill layer 2940 having a plurality of bump connections 2942, which include C4 bumps (e.g., 110-130 um pitch), or the like. These bump connections 2942 are coupled to the via structures 2924. Similarly, the logic die 2930 is coupled to the memory die 2920 via another underfill layer 2950 having a plurality of bump connections 2952, which can include ubumps (e.g., 30-40 um pitch), or the like. Further, a molding compound 2954 can be around the sides of the logic die 2930 and overlying any exposed portions of the underfill layer 2950 and exposed portions of the underlying memory die 2920.

Figure 29B:
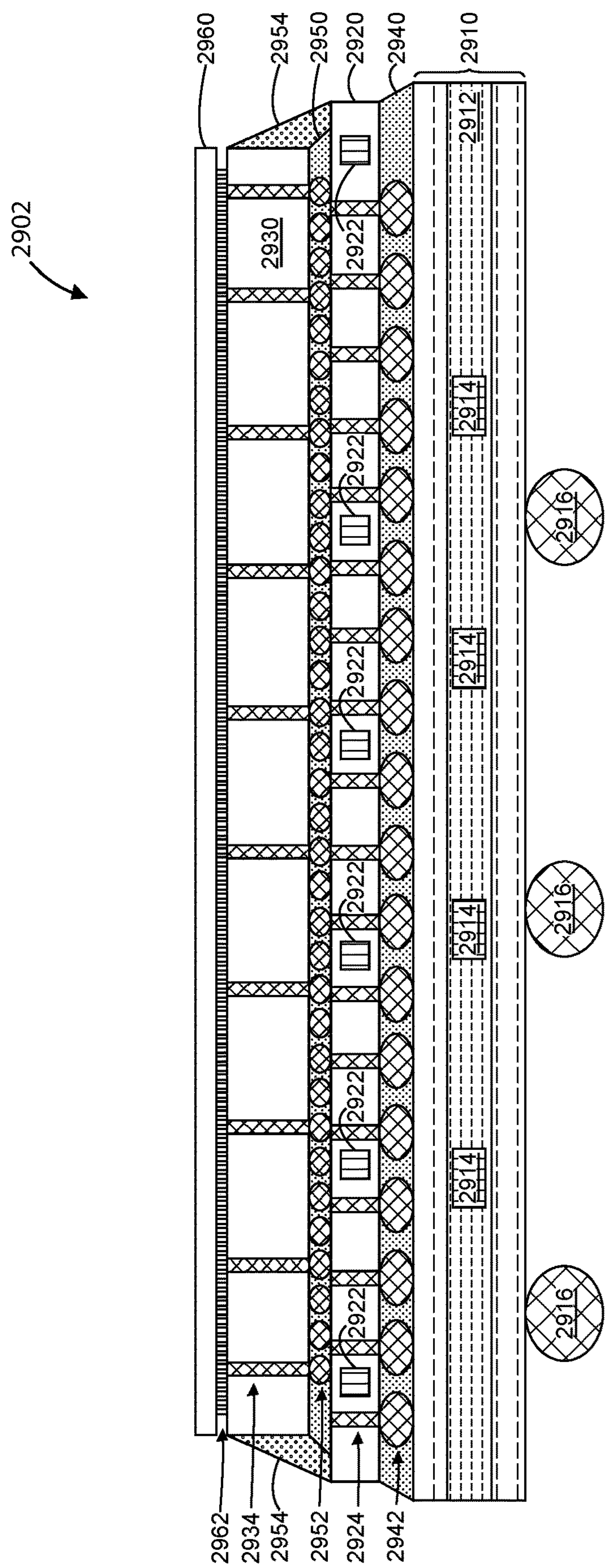
FIG. 29B is a simplified diagram illustrating a cross-sectional view of a 3D stacked AI accelerator apparatus with an organic substrate and an embedded capacitor die according to an example of the present invention.

FIG. 29B is a simplified diagram illustrating a cross-sectional view of a 3D stacked AI accelerator apparatus with an organic substrate and an embedded capacitor die according to an example of the present invention. As shown, apparatus 2902 is similar to the previous apparatus 2901 except that the logic die 2930 does not include the plurality of active embedded decoupling capacitors 2932. Here, the apparatus 2902 includes an embedded capacitor die 2960, which can include a die with embedded deep trench capacitor (eDTC), and this capacitor die 2960 is configured overlying the logic die 2930. This die 2960 is coupled to the logic die 2930 via bond interconnection 2962, which can include a wafer-on-wafer (WoW) hybrid bond (e.g., about 2-3 um pitch, or the like.

Figure 29C:
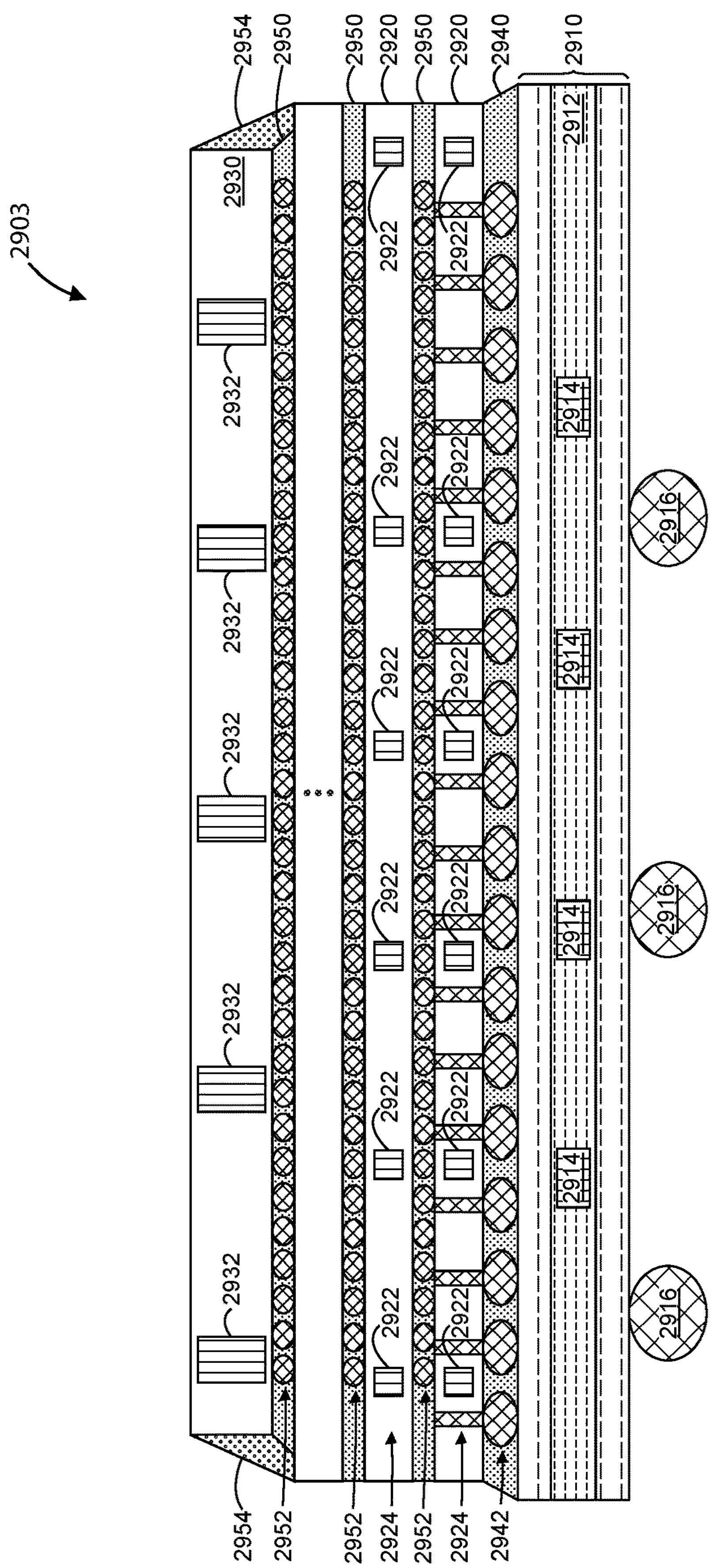
FIG. 29C is a simplified diagram illustrating a cross-sectional view of a 3D stacked AI accelerator apparatus with an organic substrate and multiple stacked memory dies according to an example of the present invention.

FIG. 29C is a simplified diagram illustrating a cross-sectional view of a 3D stacked AI accelerator apparatus with an organic substrate and multiple stacked memory dies according to an example of the present invention. As shown, apparatus 2903 extends the 3D stacking configuration of apparatus 2901 with one or more additional memory dies 2920. These additional memory dies 2920 are also coupled together by underfill layers 2950 with pluralities of bump connections 2962. Those of ordinary skill in the art will recognize other variations, modifications, and alternatives to the stacked configurations shown in FIGS. 29A-29C.

While the above is a full description of the specific embodiments, various modifications, alternative constructions and equivalents may be used. As an example, the AI accelerator apparatus and chiplet devices can include any combination of elements described above, as well as outside of the present specification. Therefore, the above description and illustrations should not be taken as limiting the scope of the present invention which is defined by the appended claims.

What is claimed is:

1. An AI accelerator apparatus configured with in-memory compute, the apparatus comprising:

- a plurality of chiplets coupled together in a full mesh connectivity configuration, each of the chiplets comprising a plurality of tiles, and each of the tiles comprising:
  - a plurality of slices,
  - a central processing unit (CPU) coupled to the plurality of slices, and
  - a hardware dispatch device coupled to the CPU;
- a first clock configured to output a clock signal of 0.5 GHz to 4 GHz;
- a plurality of die-to-die (D2D) interconnects coupled to the each of CPUs in each of the tiles, wherein at least one of the D2D interconnects of each chiplet is coupled to one of the D2D interconnects of each other chiplet using a non-diagonal link;
- a peripheral component interconnect express (PCIe) bus coupled to the CPUs in each of the tiles;
- a dynamic random access memory (DRAM) interface coupled to the CPUs in each of the tiles;
- a global reduced instruction set computer (RISC) interface coupled to each of the CPUs in each of the tiles;
- wherein each of the slices includes a digital in memory compute (DIMC) device coupled to a second clock and configured to allow for a throughput of one or more matrix computations provided in the DIMC device such that the throughput is characterized by 512 multiply accumulates per a clock cycle;
- wherein the DIMC device is coupled to the second clock configured at an output rate of one half of the rate of the first clock; and
- a substrate member configured to provide mechanical support and having a surface region, the surface region being coupled to support the plurality of chiplets.

2. The apparatus of claim 1 further comprising one or more double data rate (DDR) DRAM devices, the one or more DDR DRAM devices being coupled to one or more chiplets using the DRAM interface.

3. The apparatus of claim 1 further comprising a main bus device, the main bus device being coupled to each PCIe bus in each chiplet using a master chiplet device, the master chiplet device being coupled to each of the other chiplet devices using at least the plurality of D2D interconnects.

4. The apparatus of claim 3 further comprising a server apparatus, the apparatus being configured and operable to the server apparatus using the main bus device.

5. The apparatus of claim 4 wherein the server apparatus is one of a plurality of server apparatuses configured for a server farm within a data center.

6. The apparatus of claim 5 further comprising a power source coupled to the apparatus.

7. The apparatus of claim 1 further comprising an aggregate of transformer devices, the transformer devices comprising a plurality of transformers each of which is stacked in a layer by layer ranging from three (3) to M, where M is an integer up to 128.

8. The apparatus of claim 7 wherein each of the plurality of transformers is configured within one or more DIMC devices such that each of the transformers comprises a plurality of matrix multipliers including a query key value (QKV) matrices configured for an attention layer of a transformer followed by three fully connected (FC) matrices.

9. The apparatus of claim 8 wherein the DIMC device is configured to accelerate the transformer and further comprises a dot product of $QK^T$ followed by a softmax ($QK^T$/square root ($d_k$))V.

10. The apparatus of claim 9 wherein each of the slices includes a single input multiple data (SIMD) device configured to accelerate a computing process of the softmax.

11. The apparatus of claim 1 wherein each of the chiplets comprises four tiles arranged symmetrical to each other, each of the tiles comprises four slices.

12. The apparatus of claim 1 wherein the DIMC device is configured to support one or more block floating point data types using a shared exponent.

13. The apparatus of claim 12 wherein the DIMC device is configured to support a block structured sparsity.

14. The apparatus of claim 1 further comprising a network on chip (NoC) device configured for a multicast process and coupled to each of the plurality of slices.

15. The apparatus of claim 1 wherein the plurality of chiplets are configured to process a workload of a transformer;

wherein the transformer includes a plurality of transformer layers, each of the transformer layers having an attention layer associated with a portion of the workload; and wherein each attention layer is mapped on to one of the plurality of slices using the global RISC interface to communicate with the CPU associated with the tile of the slice to process the portion of the workload associated with the attention layer.

16. The apparatus of claim 1 wherein the substrate member includes an interposer, and wherein the plurality of chiplets is coupled to each other using the interposer.

17. The apparatus of claim 1 further comprising a first semiconductor substrate including the plurality of chiplets; and a second semiconductor substrate comprising a plurality of DRAM memory cells, one of more of the plurality of DRAM memory cells being coupled to the DRAM interface such that the first semiconductor substrate and the second semiconductor substrate are bonded through a mechanical interface.

18. The apparatus of claim 1 wherein the plurality of D2D interconnects comprises a plurality of universal chiplet interconnect express (UCIe) interconnects.

19. The apparatus of claim 1 wherein the plurality of D2D interconnects of each chiplet are configured in at least four input/output (I/O) regions in a symmetrical configuration enabling scalable chiplet array configurations in any die orientation.

20. An AI accelerator apparatus configured with in-memory compute, the apparatus comprising:

at least four chiplets, each of the chiplets comprising a plurality of tiles, and each of the tiles comprising:

a plurality of slices, a central processing unit (CPU) coupled to the plurality of slices, and a hardware dispatch device coupled to the CPU;

a first clock configured to output a clock signal of 0.5 GHz to 4 GHz;

a plurality of die-to-die (D2D) interconnects coupled to the each of CPUs in each of the tiles, wherein each of the chiplets is coupled to each other chiplet in a full mesh connectivity configuration using a plurality of intra-chiplet non-diagonal links and a plurality of inter-chiplet non-diagonal links;

a peripheral component interconnect express (PCIe) bus coupled to the CPUs in each of the tiles;

a dynamic random access memory (DRAM) interface coupled to the CPUs in each of the tiles;

a global reduced instruction set computer (RISC) interface coupled to each of the CPUs in each of the tiles;

wherein each of the slices includes a digital in memory compute (DIMC) device coupled to a second clock and configured to allow for a throughput of one or more matrix computations provided in the DIMC device such that the throughput is characterized by 512 multiply accumulates per a clock cycle;

wherein the DIMC device is coupled to the second clock configured at an output rate of one half of the rate of the first clock; and a substrate member configured to provide mechanical support and having a surface region, the surface region being coupled to support the plurality of chiplets.

21. The apparatus of claim 20 further comprising one or more double data rate (DDR) DRAM devices, the one or more DDR DRAM devices being coupled to one or more chiplets using the DRAM interface.

22. The apparatus of claim 20 further comprising a main bus device, the main bus device being coupled to each PCIe bus in each chiplet using a master chiplet device, the master chiplet device being coupled to each of the other chiplet devices using at least the plurality of D2D interconnects.

23. The apparatus of claim 22 further comprising a server apparatus, the apparatus being configured and operable to the server apparatus using the main bus device.

24. The apparatus of claim 23 wherein the server apparatus is one of a plurality of server apparatuses configured for a server farm within a data center.

25. The apparatus of claim 24 further comprising a power source coupled to the apparatus.

26. The apparatus of claim 20 further comprising an aggregate of transformer devices, the transformer devices comprising a plurality of transformers each of which is stacked in a layer by layer ranging from three (3) to M, where M is an integer up to 128.

27. The apparatus of claim 26 wherein each of the plurality of transformers is configured within one or more DIMC devices such that each of the transformers comprises a plurality of matrix multipliers including a query key value (QKV) matrices configured for an attention layer of a transformer followed by three fully connected (FC) matrices.

28. The apparatus of claim 27 wherein the DIMC device is configured to accelerate the transformer and further comprises a dot product of $QK^T$ followed by a softmax ($QK^T$/square root ($d_k$))V.

29. The apparatus of claim 28 wherein each of the slices includes a single input multiple data (SIMD) device configured to accelerate a computing process of the softmax.

30. The apparatus of claim 20 wherein each of the chiplets comprises four tiles arranged symmetrical to each other, each of the tiles comprises four slices.

31. The apparatus of claim 20 wherein the DIMC device is configured to support one or more block floating point data types using a shared exponent.

32. The apparatus of claim 20 wherein the DIMC device is configured to support a block structured sparsity.

33. The apparatus of claim 20 further comprising a network on chip (NoC) device configured for a multicast process and coupled to each of the plurality of slices.

34. The apparatus of claim 20 wherein the chiplets are configured to process a workload of a transformer;

wherein the transformer includes a plurality of transformer layers, each of the transformer layers having an attention layer associated with a portion of the workload; and wherein each attention layer is mapped on to one of the plurality of slices using the global RISC interface to communicate with the CPU associated with the tile of the slice to process the portion of the workload associated with the attention layer.

35. The apparatus of claim 20 wherein the substrate member includes an interposer, and wherein the chiplets are coupled to each other using the interposer.

36. The apparatus of claim 20 further comprising a first semiconductor substrate including the chiplets; and a second semiconductor substrate comprising a plurality of DRAM memory cells, one of more of the plurality of DRAM memory cells being coupled to the DRAM interface such that the first semiconductor substrate and the second semiconductor substrate are bonded through a mechanical interface.

37. The apparatus of claim 20 wherein the plurality of D2D interconnects comprises a plurality of universal chiplet interconnect express (UCIe) interconnects.

38. The apparatus of claim 20 wherein the plurality of D2D interconnects of each chiplet are configured in at least four input/output (I/O) regions in a symmetrical configuration enabling scalable chiplet array configurations in any die orientation.

39. An AI accelerator apparatus configured with in-memory compute, the apparatus comprising:

a plurality of chiplets coupled together in a full mesh connectivity configuration, each of the chiplets comprising a plurality of tiles, and each of the tiles comprising:

a plurality of slices, and a central processing unit (CPU) coupled to the plurality of slices;

a plurality of die-to-die (D2D) interconnects coupled to the each of CPUs in each of the tiles, wherein at least one of the D2D interconnects of each chiplet is coupled to one of the D2D interconnects of each other chiplet using a non-diagonal link;

wherein each of the slices includes a digital in memory compute (DIMC) device; and a substrate member configured to provide mechanical support and having a surface region, the surface region being coupled to support the plurality of chiplets.

40. The apparatus of claim 39 wherein the plurality of chiplets includes at least four chiplets; and wherein each of the chiplets is coupled to each other chiplet in a full mesh connectivity configuration using a plurality of intra-chiplet non-diagonal links and a plurality of inter-chiplet non-diagonal links.

* * * * *